(12) United States Patent
Tsusaka et al.

(10) Patent No.: US 7,751,938 B2
(45) Date of Patent: Jul. 6, 2010

(54) ROBOT ARM CONTROL DEVICE AND CONTROL METHOD, ROBOT, AND CONTROL PROGRAM

(75) Inventors: Yuko Tsusaka, Osaka (JP); Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/525,233

(22) PCT Filed: Jun. 26, 2008

(86) PCT No.: PCT/JP2008/001668

§ 371 (c)(1),
(2), (4) Date: Jul. 30, 2009

(87) PCT Pub. No.: WO2009/004772

PCT Pub. Date: Jan. 8, 2009

(65) Prior Publication Data

US 2010/0114371 A1     May 6, 2010

(30) Foreign Application Priority Data

Jul. 5, 2007     (JP) .............................. 2007-176990

(51) Int. Cl.
*G05B 19/18* (2006.01)

(52) U.S. Cl. .................. 700/250; 700/90; 700/245; 700/253; 700/257; 700/264; 318/568.11; 318/568.12; 318/568.14; 318/568.2; 318/568.22; 382/153; 706/45; 706/46; 706/59; 706/61; 901/2; 901/8; 901/14; 901/19; 901/27

(58) Field of Classification Search ................ 700/250, 700/90, 245, 253, 257, 264; 382/153
See application file for complete search history.

(56) References Cited

U.S. PATENT DOCUMENTS

| 6,895,286 | B2 * | 5/2005 | Kaji et al. ............... 700/28 |
| 7,539,558 | B2 * | 5/2009 | Adachi et al. .......... 700/245 |
| 2006/0195225 | A1 * | 8/2006 | Aoki et al. ............. 700/245 |
| 2007/0061041 | A1 * | 3/2007 | Zweig .................... 700/245 |
| 2007/0150105 | A1 * | 6/2007 | Orita et al. ............. 700/245 |

(Continued)

FOREIGN PATENT DOCUMENTS

JP      5-261683      10/1993

(Continued)

OTHER PUBLICATIONS

International Search Report issued Sep. 16, 2008 in the International (PCT) Application No. PCT/JP2008/001668.

*Primary Examiner*—Khoi Tran
*Assistant Examiner*—Jonathan Sample
(74) *Attorney, Agent, or Firm*—Wenderoth, Lind & Ponack, L.L.P.

(57) ABSTRACT

There is provided a control device for a robot arm which includes an operation procedure information acquisition means for acquiring information on the procedure of a domestic operation, a progress management means for managing information on the progress of the operation, and a control parameter setting means for setting a control parameter for the robot arm based on the operation procedure information and the progress information, whereby the control device controls an operation of the robot arm based on the control parameter from the control parameter setting means.

12 Claims, 23 Drawing Sheets

U.S. PATENT DOCUMENTS

| | | | |
|---|---|---|---|
| 2007/0152619 A1* | 7/2007 | Sugiyama et al. | 318/568.12 |
| 2007/0239315 A1* | 10/2007 | Sato et al. | 700/245 |
| 2008/0161970 A1* | 7/2008 | Adachi et al. | 700/253 |
| 2009/0173560 A1* | 7/2009 | Nakamoto et al. | 180/167 |

FOREIGN PATENT DOCUMENTS

| | | |
|---|---|---|
| JP | 10-230489 | 9/1998 |
| JP | 2000-343478 | 12/2000 |
| JP | 2004-90099 | 3/2004 |
| JP | 2004-180817 | 7/2004 |
| JP | 2006-198389 | 8/2006 |
| JP | 2007-76807 | 3/2007 |
| WO | 2006/006624 | 1/2006 |
| WO | 2006/043396 | 4/2006 |

* cited by examiner

Fig.3

| OPERATION ID | PROCESS ID | OPERATION PROCEDURE INFORMATION ||||| PROGRESS INFORMATION ||| COOKING INSTRUMENT INFORMATION ||
| | | PROCESS | OBJECT INFORMATION | OPERATION INFORMATION (PERSON, ROBOT 1, AND ROBOT 2) | EXPECTED PERIOD (sec) | AMOUNT | ELAPSED PERIOD (sec) | CURRENT OPERATION | CLOCK TIME | INSTRUMENT ID | CONTROL ID |
|---|---|---|---|---|---|---|---|---|---|---|---|
| 0001 | 0001 | MOUNT ROBOT ARM 5-1 TO HANDLE OF PAN. | WATER | (1,0,0) | 100 | 4 | 120 | 0 | 17:34 | | |
| 0001 | 0002 | POUR 1 LITER OF WATER INTO PAN. | WATER | (1,1,0) | 120 | 4 | 130 | 0 | 17:40 | | |
| 0001 | 0003 | GUIDE PAN TO COOKING RANGE TABLE. | WATER | (1,1,0) | 130 | 4 | 200 | 1 | 17:45 | 1 | 1001 |
| 0001 | 0004 | TURN COOKING RANGE ON AND BOIL WATER IN PAN. | WATER | (1,0,0) | 300 | 4 | | 0 | | | |
| 0001 | 0005 | CUT RADISH AND TOFU INTO CUBES. | RADISH AND TOFU | (1,0,0) | 300 | 4 | | 0 | | | |
| 0001 | 0006 | PUT RADISH INTO PAN. | RADISH | (1,0,0) | 20 | 4 | | 0 | | | |
| 0001 | 0007 | MOUNT LADLE TO ROBOT ARM 5-2. | | (1,0,1) | 120 | 4 | | 0 | | | |
| 0001 | 0008 | PUSH STIRRING START BUTTON. | RADISH | (1,0,0) | 10 | 4 | | 0 | | | |
| 0001 | 0009 | PUSH STOP BUTTON AND PUT THE TOFU IN. | RADISH AND TOFU | (1,0,0) | 30 | 4 | | 0 | | | |
| 0001 | 0010 | THAW MEAT WITH MICROWAVE OVEN. | MEAT | (1,0,0) | 600 | 4 | | 0 | | 2 | 2001 |
| 0001 | .... | .... | .... | .... | .... | .... | .... | .... | .... | .... | .... |
| 0001 | 0030 | END | | (0,0,0) | 10 | 4 | | 0 | | | |
| .... | .. | .. | .. | .. | .. | .. | .. | .. | .. | .. | .. |

| ID | TIME AND DATE OF MEASUREMENT | AGE | GENDER | NAME | POSITION OF HAND | STATE OF GRASPING | DOMINANT ARM | SKILL INFORMATION OPERATION ID | LEVEL |
|---|---|---|---|---|---|---|---|---|---|
| 1 | 2006/2/15 8:00 | 28 | 2 | HANAKO MATSUSHITA | (1.0, 0.3, 1.0) | 1 | 1 | 0001 | 3 |
| 1 | 2006/2/16 8:00 | 28 | 2 | HANAKO MATSUSHITA | (1.0, 0.3, 1.0) | 0 | 1 | 0002 | 5 |
| 2 | 2006/2/17 12:00 | 10 | 1 | TARO MATSUSHITA | (1.0, 0.3, 1.0) | 1 | 2 | 0001 | 1 |
| ... | ... | | | | | | | | |

*Fig. 12*

| CLOCK TIME | FORCE | POSITION |
|---|---|---|
| 00:00:40 | 5 | (0.5,0.2,0.3,0.2,0.3,0.4) |
| 00:01:02 | 6 | (0.5,0.3,0.35,0.2,0.3,0.4) |
| 00:01:20 | 3 | (0.5,0.4,0.35,0.2,0.3,0.4) |
| .... | .... | .... |

*Fig.13*

| CLOCK TIME | LEVEL |
|---|---|
| 6:00-8:59 | 5 |
| 9:00-15:59 | 2 |
| 16:00-18:59 | 4 |
| 19:00-21:59 | 3 |
| 22:00-5:59 | 5 |

Fig.18

| OPERATION ID | PROCESS ID | OPERATION PROCEDURE INFORMATION ||||| PROGRESS INFORMATION ||| COOKING INSTRUMENT INFORMATION ||
| | | PROCESS | OBJECT INFORMATION | OPERATION INFORMATION (PERSON, ROBOT 1, AND ROBOT 2) | EXPECTED PERIOD (sec) | AMOUNT | ELAPSED PERIOD (sec) | CURRENT OPERATION | CLOCK TIME | INSTRUMENT ID | CONTROL ID |
|---|---|---|---|---|---|---|---|---|---|---|---|
| 0002 | 0001 | MOUNT SPONGE TO ROBOT ARM 5-2. | SPONGE | (1,0,1) | 100 | 4 | 120 | 1 | 17:34 | | |
| 0002 | 0002 | PUSH WIPE CLEANING START BUTTON. | WALL | (1,0,0) | 900 | 4 | | 0 | | | |
| .... | .... | .... | .... | .... | .... | .... | .... | .... | .... | .... | .... |
| 0002 | 0030 | END | | (0,0,0) | 10 | 4 | | 0 | | | |
| .. | .. | .. | .. | .. | .. | .. | .. | .. | .. | .. | .. |

~20

ROBOT ARM CONTROL DEVICE AND CONTROL METHOD, ROBOT, AND CONTROL PROGRAM

TECHNICAL FIELD

The present invention relates to a robot arm control device and control method, a robot including the robot arm control device, a robot arm control program, and an integrated electronic circuit, for causing a person and a robot to perform domestic operations (for example, cooking operations) in cooperation with each other.

BACKGROUND ART

In recent years, domestic robots, such as caring robots and housework (domestic) supporting robots, are actively developed. Such domestic robots are required to be easily operated, since amateurs who are in homes and not experts operate the domestic robots, unlike industrial robots. Further, such robots are required to operate in various operation environments and therefore are required to flexibly cope with domestic environments.

As an example of a robot device, there has been proposed a technique related to control for withdrawal to cause a robot arm to move and withdraw in a predetermined direction by a predetermined amount and thereafter to move to a standby position, in order to prevent the robot arm from interfering with a workpiece in causing the robot arm to move to the predefined standby position at the stop of operations (see Patent Document 1).

Patent Document 1: Japanese Unexamined Patent Publication No. 2000-343478

DISCLOSURE OF INVENTION

Issues to be Solved by the Invention

However, conventional techniques as that described above merely prevents the robot device from interfering with a workpiece during withdrawing movement and therefore cannot change the standby method according to information on the progress of operations carried out by the robot device or the state of the workpiece. Further, there has been an issue that the standby method cannot be changed according to the state of operations by the person who operates the robot device.

In view of the aforementioned issues, it is an object of the present invention to provide a robot arm control device and control method, a robot including the robot arm control device, a robot arm control program, and an integrated electronic circuit which realize robot control capable of changing the method for controlling the operations of the robot arm according to procedure information and progress information of domestic operations including processes in which cooperation with the robot arm is included.

Means for Solving the Issues

In order to achieve the aforementioned object, there are provided the following structures according to the present invention.

According to a first aspect of the present invention, there is provided a robot arm control device, comprising:

an operation procedure information acquisition means for acquiring information on a procedure of a domestic operation including a plurality of processes in which a person and a robot arm cooperate with each other;

a progress management means for managing information on progress of the domestic operation based on the domestic operation procedure information which has been acquired by the operation procedure information acquisition means;

a control parameter setting means for setting a control parameter for the robot arm, based on the domestic operation procedure information and the domestic operation progress information; and a control means for controlling an operation of the robot arm based on the control parameter set by the control parameter setting means.

According to a fifteenth aspect of the present invention, there is provided a method for controlling a robot arm, comprising:

acquiring information on a procedure of domestic operation including a plurality of processes in which a person and the robot arm cooperate with each other by an operation procedure information acquisition means, and managing information on progress of the domestic operation by a progress management means;

setting a control parameter for the robot arm, based on the domestic operation procedure information and the domestic operation progress information by a control parameter setting means; and controlling an operation of the robot arm based on the set control parameter by a control means.

According to a seventeenth aspect of the present invention, there is provided a program for controlling a robot arm, which program can be executed by a computer, characterized by comprising steps of: acquiring information on a procedure of a domestic operation including a plurality of processes in which a person and the robot arm cooperate with each other; managing information on progress of the domestic operation; setting a control parameter for the robot arm based on the domestic operation procedure information and the domestic operation progress information; and controlling an operation of the robot arm based on the set control parameter.

According to an eighteenth aspect of the present invention, there is provided an integrated electronic circuit which controls a robot arm, characterized by comprising: an operation procedure information acquisition means for acquiring information on a procedure of domestic operation including a plurality of processes in which a person and the robot arm cooperate with each other; a progress management means for managing information on progress of the domestic operation based on the domestic operation procedure information; a control parameter setting means for setting a control parameter for the robot arm based on the domestic operation procedure information and the domestic operation progress information; and a control means for controlling an operation of the robot arm based on the control parameter set by the control parameter setting means.

EFFECTS OF THE INVENTION

As described above, according to the robot arm control device and the robot including the robot arm control device according to the present invention, there are provided the operation procedure information acquisition means, the progress management means, the control parameter setting means, and the control means, which enable changeover between a position control mode and a control mode for causing the robot arm to move according to the force of the person or also enable properly setting mechanical impedance set values for the robot arm, according to the domestic operation procedure information and the domestic operation progress information. Accordingly, when the robot arm which has operated in the position control mode is stopped, it is possible to make the robot arm withdraw easily to a position at which the robot arm does not interfere with the person, and it is also possible to realize robot control with excellent safety and operability which can eliminate risks of the person accidentally crushing soft materials or spilling hot water when the robot arm is withdrawn.

Further, according to the robot arm control method and the control program of the present invention, it is possible to change over between the position control mode and the control mode for moving the robot arm according to the force of the person, or it is also possible to properly set mechanical impedance set values for the robot arm, based on the domestic operation procedure information and the domestic operation progress information. Accordingly, when the robot arm which has operated in the position control mode is stopped, it is possible to withdraw the robot arm easily to a position at which the robot arm does not interfere with the person, and it is also possible to realize robot control with excellent safety and operability which can eliminate risks of the person accidentally crushing soft materials or spilling hot water when the robot arm is withdrawn.

Further, the domestic operation such as cooking is a combination of a plurality of operation processes, such as preparation of ingredients, cooking operations using a pan or frying pan, or cleanup, and there is a need for successively performing the processes without stopping them at short intervals halfway therethrough. To cope therewith, according to the present invention, the control parameter setting means is caused to set the control parameter for the robot arm based on the procedure information of the domestic operation which has been acquired by the operation procedure information acquisition means and which includes a plurality of processes and the progress information on the domestic operation which is managed by the progress management means, and further, the control means is caused to control the operation of the robot arm based on the set control parameter. This enables successive performing of the processes without stopping them at short intervals halfway therethrough.

Further, persons in various conditions perform cooking, and for example, they may have different dominant arms and have different level of skills to carry out domestic operations, such as in the case of adults and children. To cope therewith, according to the present invention, with the aforementioned structure, the operation procedure information acquisition means acquires, as operation condition information, for example, information indicating that persons who are to perform cooking are in various conditions, such as information indicative of their different dominant arms or different levels of skills to carry out domestic operations, e.g., in the case of adults and children. Further, the control parameter setting means sets the control parameter for the robot arm based on the operation condition information, the procedure information of the domestic operation, and the progress information on the domestic operation which is managed by the progress management means. Further, the control means controls the operation of the robot arm based on the set control parameter. This enables coping with various conditions of persons to perform cooking.

Further, since the operators of the robot are amateurs who are in homes and not experts at operating robots, the robots are required to be easily operated. To cope therewith, according to the present invention, it is possible to change over between the position control mode and the control mode for causing the robot arm to move according to the force of the person, according to the domestic operation procedure information and the domestic operation progress information. This enables even an amateur to easily make the robot arm move according to the force of the person.

BRIEF DESCRIPTION OF DRAWINGS

These and other aspects and features of the present invention will become clear from the following description taken in conjunction with the preferred embodiments thereof with reference to the accompanying drawings, in which:

FIG. 3 is a view illustrating, in the form of a table, examples of operation procedure information, progress information, and cooking instrument information in an operation database in the robot arm control device;

FIG. 4 is a view illustrating, in the form of a table, an example of information on operation states of the person in the operation database in the robot arm control device;

FIG. 12 is a view illustrating, in the form of a table, an example of information on operation states of a person in the operation database in the robot arm control device according to the third embodiment;

FIG. 13 is a view illustrating, in the form of a table, an example of information on time of operations and levels in the operation database in the robot arm control device according to the first embodiment of the present invention;

FIG. 18 is a view illustrating, in the form of a table, an example of operation procedure information in the operation database in the robot arm control device according to the fourth embodiment;

BEST MODE FOR CARRYING OUT THE INVENTION

Figure 1A:
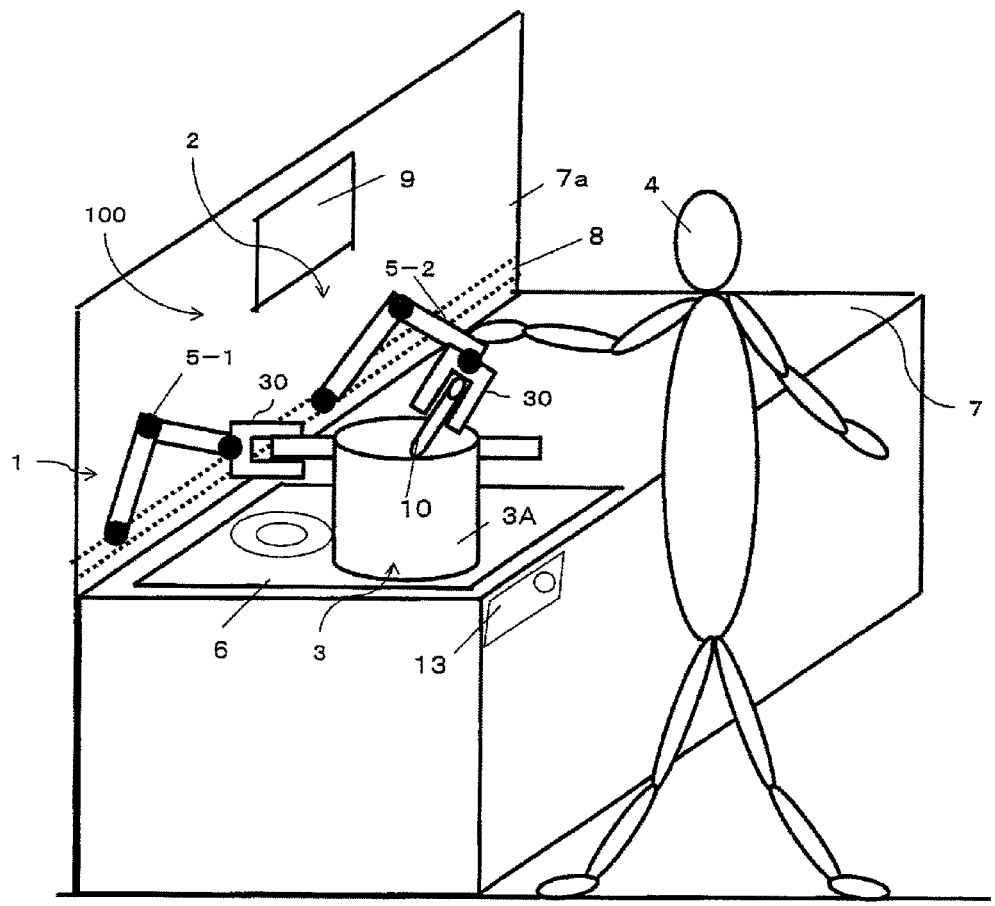
FIG. 1A is a view illustrating the general outline of the structure of a robot control device and a state where the robot cooperates with a person, according to a first embodiment of the present invention.

Embodiments of the present invention will be described below in detail with reference to the drawings.

Hereinafter, there will be described various aspects of the present invention before proceeding to the detail description of the embodiments of the present invention with reference to the drawings.

According to a first aspect of the present invention, there is provided a robot arm control device, comprising: an operation procedure information acquisition means for acquiring information of a procedure of a domestic operation including a plurality of processes in which a person and the robot arm cooperate with each other; a progress management means for managing information on the progress of the domestic operation based on the domestic operation procedure information which has been acquired by the operation procedure information acquisition means; a control parameter setting means for setting a control parameter for the robot arm based on the domestic operation procedure information and the domestic operation progress information; and a control means for controlling an operation of the robot arm based on the control parameter set by the control parameter setting means.

With this structure, it is possible to set and control the control parameter based on the operation procedure information and the progress information.

According to a second aspect of the present invention, there is provided the robot arm control device according to the first aspect, wherein the control parameter setting means sets the control parameter for the robot arm in such a way as to change over, based on the domestic operation procedure information and the progress information, a control mode of the robot arm between a position control mode and a control mode for causing the robot arm to move according to the force of the person, based on the domestic operation procedure information and the domestic operation progress information.

According to a third aspect of the present invention, there is provided the robot arm control device according to the first aspect, wherein the domestic operation procedure information is information on the procedure of a cooking operation including cooking operation processes in which the person and the robot arm to cooperate with each other, and the control parameter setting means sets the control parameter for the robot arm in such a way as to change over a control mode of the robot arm between a position control mode and a control mode for causing the robot arm to move according to the force of the person, based on the progress information of the procedure information.

With this structure, it is possible to change over between the position control mode and the control mode for causing the robot arm to move according to the force of the person based on the progress information of the procedure information of the cooking operation.

According to a fourth aspect of the present invention, there is provided the robot arm control device according to the first aspect, wherein the domestic operation procedure information includes a cooking operation procedure information and also includes identification information and operation information of a cooking device which exists around the robot arm control device and is used in the cooking operation procedure information.

With this structure, it is possible to set and control the control parameter based on the information of the cooking device existing around the robot arm control device and the information on the progress thereof.

According to a fifth aspect of the present invention, there is provided the robot arm control device according to the first aspect, wherein the control parameter setting means sets a mechanical impedance set values for the robot arm based on the domestic operation procedure information and the domestic operation progress information, and the control means controls a mechanical impedance values of the robot arm to the mechanical impedance set values set by the control parameter setting means for controlling the operation of the robot arm.

With this structure, it is possible to set the mechanical impedance set values for the robot arm based on the operation procedure information and the progress information, and it is also possible to cause the control part to control the mechanical impedance values for the robot arm to the mechanical impedance set values set by the control parameter setting means.

According to a sixth aspect of the present invention, there is provided the robot arm control device according to the fifth aspect, wherein the control parameter setting means sets mechanical impedance set values individually in six dimensional directions which are translational directions and rotational directions with respect to the hand of the robot arm, based on the domestic operation procedure information and the domestic operation progress information.

With this structure, it is possible to set and control the mechanical impedance set values in the six dimensional directions based on the operation procedure information and the progress information.

According to a seventh aspect of the present invention, there is provided the robot arm control device according to the sixth aspect, wherein the domestic operation procedure information is information on a procedure of a cooking operation which describes a cooking method and includes information on a procedure of the cooking method and information on an ingredient to be subjected to the cooking operation in the cooking method, and the control parameter setting means sets viscosity and rigidity of the mechanical impedance values for the robot arm in a case where the information on the ingredient to be subjected to the cooking operation indicates the ingredient that is prone to crush or has viscosity to be larger than the viscosity and the rigidity of the mechanical impedance values for the robot arm in a case where the information on the ingredient to be subjected to the cooking operation indicates the ingredient being less prone to crush or having less viscosity, based on the cooking operation progress information.

With this structure, it is possible to set the control parameter based on the information on the ingredient.

According to an eighth aspect of the present invention, there is provided the robot arm control device according to the sixth aspect, wherein an operation of a robot arm different from the robot arm is controlled independently of the robot arm, by the control parameter setting means and the control means, wherein the cooking operation procedure information includes information as to whether or not the a plurality of robot arms are to be operated, and the control parameter setting means sets a viscosity and a rigidity of the mechanical impedance values for the robot arm which is not to be operated, to be larger than a viscosity and a rigidity of the mechanical impedance values for the robot arm to be operated.

With this structure, it is possible to set the control parameters based on the activation condition of the robot arms.

According to a ninth aspect of the present invention, there is provided the robot arm control device according to the sixth aspect, wherein the progress information of the cooking operation procedure information includes information on elapsed periods of the a plurality of cooking processes included in the procedure information, and the control parameter setting means sets magnitudes of a viscosity and a rigidity of the mechanical impedance values for the robot arm in proportion to the magnitude of the total sum value the elapsed periods.

With this structure, it is possible to set the control parameters based on the respective elapsed periods of the cooking processes.

According to a tenth aspect of the present invention, there is provided the robot arm control device according to the first aspect, wherein the operation procedure information acquisition means acquires operation condition information which is information on a state of the domestic operation by the person who cooperates with the robot arm, in addition to the domestic operation procedure information and the domestic operation progress information, and the control parameter setting means sets the control parameter based on the domestic operation procedure information, the domestic operation progress information, and the operation condition information.

With this structure, it is possible to set and control the control parameters based on the operation condition (state) information, the operation procedure information, and the progress information.

According to an eleventh aspect of the present invention, there is provided the robot arm control device according to the tenth aspect, wherein the operation condition information includes information on the position of the person, information on the dominant arm of the person, or information on a grasping state of a hand of the dominant arm of the person, or skill information indicative of an ability of the person to carry out a domestic operation.

With this structure, it is possible to set and control the control parameters based on the information on the position of the person or the dominant arm of the person, information on the grasping state of the hand of the person, operation procedure information, and the progress information.

According to a twelfth aspect of the present invention, there is provided the robot arm control device according to the tenth aspect, wherein the operation condition information includes information on force which the person has applied when performing the domestic operation in cooperation with the robot arm, and the position of the hand of the robot arm which moves according to the force.

With this structure, it is possible to set and control the control parameters based on the information on force which the person has applied when operating the robot arm, the position of the hand of the robot arm at that time, the operation procedure information, and the progress information.

According to a thirteenth eleventh aspect of the present invention, there is provided the robot arm control device according to the twelfth aspect, further comprising a comparison means for making a comparison in a chronological order between the information on the force and the position of the hand of the robot arm, and current information on the force of the person and the position of the hand of the robot arm, wherein when the comparison means determines agreement thereof, the control parameter setting part changes over a control mode of the robot arm to a position control mode from a control mode for causing the robot arm to move according to the force of the person.

With this structure, it is possible to perform changeover to the position control mode from the control mode for causing the robot arm to move according to the force of the person, in a case where the current force information and hand position agree with the force information and the hand position information acquired by the operation procedure information acquisition means.

According to a fourteenth aspect of the present invention, there is provided the robot arm control device according to the first aspect, further comprising a display means for displaying the domestic operation procedure information and the domestic operation progress information.

With this structure, it is possible to display the operation condition information and the progress information.

According to a fifteenth aspect of the present invention, there is provided a method for controlling a robot arm, including: acquiring information on a procedure of a domestic operation including a plurality of processes in which a person and the robot arm cooperate with each other by an operation procedure information acquisition means, and managing information on the progress of the domestic operation by a progress management means; setting a control parameter for the robot arm based on the domestic operation procedure information and the domestic operation progress information by a control parameter setting means; and controlling an operation of the robot arm based on the set control parameter by a control means.

According to a sixteenth aspect of the present invention, there is provided a robot including: the robot arm; and the robot arm control device according to any one of the first to fourteenth aspects which controls the operation of the robot arm.

According to a seventeenth aspect of the present invention, there is provided a program for controlling a robot arm, which program can be executed by a computer, comprising steps of: acquiring information on a procedure of a domestic operation including a plurality of processes in which a person and the robot arm cooperate with each other; managing information on the progress of the domestic operation; setting a control parameter for the robot arm based on the domestic operation procedure information and the domestic operation progress information; and controlling an operation of the robot arm based on the set control parameter.

According to an eighteenth aspect of the present invention, there is provided an integrated electronic circuit which controls a robot arm, comprising: an operation procedure information acquisition means for acquiring information on a procedure of a domestic operation including a plurality of processes in which a person and the robot arm cooperate with each other; a progress management means for managing information on the progress of the domestic operation based on the domestic operation procedure information; a control parameter setting means for setting a control parameter for the robot arm based on the domestic operation procedure information and the domestic operation progress information; and a control means for controlling an operation of the robot arm based on the control parameter set by the control parameter setting means.

With this structure, it is possible to set and control the control parameters based on the operation procedure information and the progress information.

Embodiments of the present invention will be described below in detail with reference to the drawings.

First Embodiment

First, there will be described the structure of a robot system 100 including a control device for robot arm according to a first embodiment of the present invention. FIG. 1A is a view illustrating the general outline of the structure of the robot system 100 according to the first embodiment of the present invention.

As illustrated in FIG. 1A, the robot system 100 including robot arms 5 and a control device 105 therefor according to the first embodiment of the present invention is structured to include a first robot system 1 and a second robot system 2, and first and second robot arms 5-1 and 5-2 in the two robot systems 1 and 2 (which will be representatively referred to as "robot arms 5" in the case where there is no need for distinguishing the first and second robot arms 5-1 and 5-2 from each other, in the following description) are installed on a wall surface 7a of an operation table 7 such as a kitchen or a table, and the first and second robot arms 5-1 and 5-2 are movably supported at their base ends on a rail 8 secured to the wall surface 7a, so that the first and second robot arms 5-1 and 5-2 can move in a lateral direction along the rail 8 independently of each other, for example, in a horizontal direction.

Figure 1B:
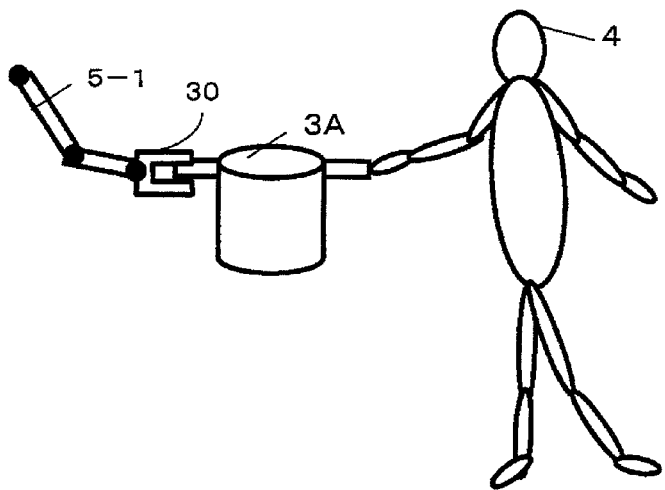
FIG. 1B is a view illustrating the general outline of the structure of the robot control device and a state where the robot cooperates with the person, according to the first embodiment of the present invention.

As illustrated in FIG. 1B, the first robot system 1 is a robot system which carries, for example, a tool 3 such as a heavy pan as an example of an object, inside home using the first robot arm 5-1 in cooperation with a person 4, and the first robot system 1 has a hand 30 at the tip end of the first robot arm 5-1 so that it is capable of holding, for example, grasping one handle of a pair of handles of the tool 3 while allowing the person 4 who is cooperating with the first robot arm 5-1 to grasp the other handle of the tool 3. In a state where the hand 30 at the tip end of the first robot arm 5-1 grasps one handle of the tool 3 while the person 4 grasps the other handle of the tool 3, when the person 4 applies force thereto in the direction in which he or she desires to carry the tool 3, this causes the first robot system 1 to operate for causing the first robot arm 5-1 to move along the rail 8, so that the first robot arm 5-1 and the person 4 can carry the tool 3 in cooperation with each other.

The second robot system 2 is a robot system which mainly performs, using the second robot arm 5-2, domestic operations which require the second robot arm 5-2 to cooperate with the person 4 (operations which include a plurality of processes and in which the second robot arm 5-2 performs predetermined operations in response to commands from the person 4 or by being monitored by the person 4) other than the operation of carrying the tool 3 inside the home, such as the operation of stirring ingredients in a pan 3A serving as an exemplary tool 3 or the operation of wiping off stains on the operation table 7 in the kitchen.

Also, as required, the operations of the first robot system 1 and the second robot system 2 can be interchanged.

A display part 9 which is an example of a display means is a display which displays information on the procedure of a domestic operation such as cooking recipe information (information on the procedure of a cooking operation including cooking operation processes in which the person and the robot arms cooperate with each other) or information on the progress of the domestic operation. As an example of the procedure of operation of the second robot system 2 for stirring the content of a pan or for wiping for cleaning, as illustrated in FIG. 1A, the person 4 first directly grasps the second robot arm 5-2 in the second robot system 2 and the person 4 applies force onto the second robot arm 5-2, according to the operation procedure displayed on the display part 9, which causes the second robot system 2 to operate for causing the second robot arm 5-2 to move along the rail 8, thereby guiding the second robot arm 5-2 close to the tool 3. Next, the person 4 mounts a cooking tool 10 such as a ladle to the hand 30 at the tip end of the second robot arm 5-2 in the second robot system 2. Next, an operation panel 13 for the first robot system 1 and the second robot system 2 is disposed on a side surface of a cooking device 6 which is a cooking range table of a cooling instrument, e.g., an IH cooking heater or a stove burner, on the operation table 7, and the person 4 pushes buttons on the operation panel 13 for operating the first robot system 1 to start the operation of carrying the tool 3 and also for operating the second robot arm 2 to start the stirring operation or the wiping cleaning operation.

The operation panel 13 includes, for example, a button for starting and stopping driving of the first robot system and a button for starting and stopping driving of the second robot system, which are structured such that, when pushed once, a driving start signal is inputted to a data input IF 26 and, when pushed one more time, a driving stop signal is inputted to the data input IF 26. However, the structure is not limited thereto, and the operation panel 13 may be structured in any other structure, such as a structure constituted by a button for starting and stopping the driving and a button for changing over between the first robot system and the second robot system, provided that the drive of the first robot system 1 and the second robot system 2 can be started or stopped independently of each other. In this case, the term "starting driving" means realizing a state where it is possible to start driving of the respective robot arms 5 in the robot systems, and also can mean starting driving of the robot arms 5 depending on the operation.

The tool 3 according to the first embodiment of the present invention is simply a concept covering heavy objects, such as pans or dishes containing water or ingredients, as well as pans or dishes themselves and indicates an object which at least one of the first robot arm 5-1 and the second robot arm 5-2 can carry in cooperation with the person 4.

While, in the first embodiment of the present invention, the rail 8 is disposed on the wall surface 7a of the operation table 7, in the case of an island kitchen with no wall surface, the rail 8 is installed at a place suitable for operations, such as on the ceiling surface or on a side surface of the top panel in the island kitchen.

Further, while, in the first embodiment of the present invention, the operation panel 13 is secured to a side surface of the cooking device 6, the operation panel 13 may be a remote control which enables remote operation.

Figure 2:
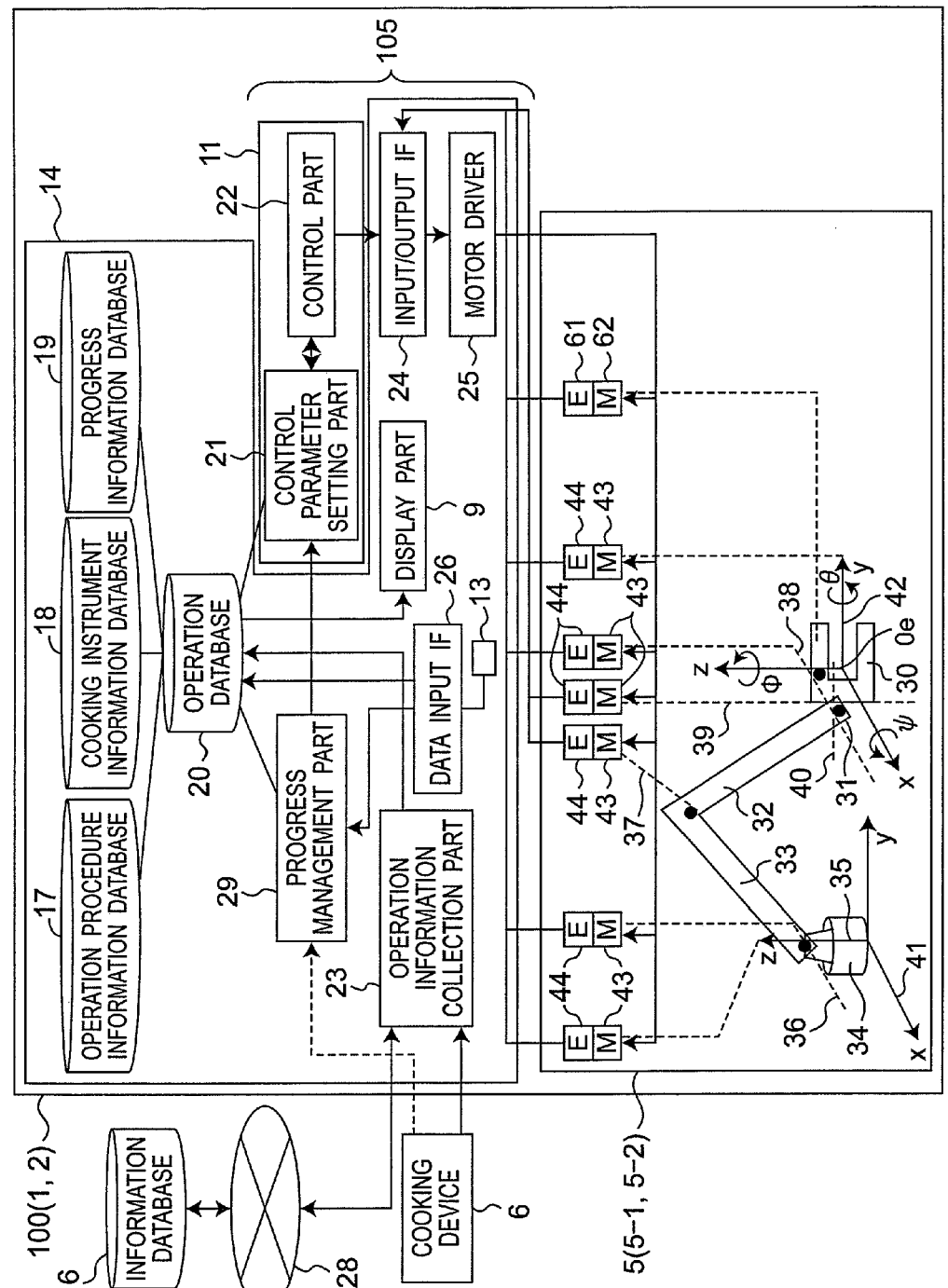
FIG. 2 is a view illustrating the detailed structures of a robot arm control device and a robot arm to be controlled, which are constituents of a robot system according to the first embodiment of the present invention.

FIG. 2 is a view illustrating the detailed structure of the robot system 100, and the figure illustrates, as a typical example, the structure of the robot arm 5-2 which is a constituent of the second robot system 2 and is an object to be controlled and the structure of a control device 105 therefor (a control-device main-body part 11 and a peripheral device 14). While the second robot system 2 will be described with reference to FIG. 2, since the first robot system 1 has a similar structure, the description thereof will not be given.

The control-device main-body part 11 and the peripheral device 14 which constitute the control device 105 for the robot arms 5 are constituted by, for example, general personal computers.

The control-device main-body part 11 is structured to include a control parameter setting part 21 as an example of a control parameter setting means and a control part 22 as an example of a control means. The peripheral device 14 is structured to include an operation database 20, an operation information collection part 23, the data input IF (interface) 26, an input/output IF (interface) 24, a motor driver 25 as an example of a joint-part driving/controlling means (a joint-part driving/controlling part), the display part 9 as an example of an information output means (an information output part) or display means, and a progress management part 29 as an example of a progress management means. An example of an operation procedure information acquisition means is constituted by the operation database 20 or by both the operation database 20 and the operation information collection part 23.

The input/output IF 24 is structured to include, for example, a D/A board, an A/D board, and a counter board which are connected to expansion slots, such as PCI buses in a personal computer.

By operating the control-device main-body part 11 which controls the operation of the second robot arm 5-2, and the peripheral device 14, information on respective joint angles which are outputted from encoders 44 to be described later of respective joint parts of the second robot arm 5-2 is taken in the control-device main-body part 11 through the counter board in the input/output IF 24. Based on the taken information on the joint angles, the control-device main-body part 11 calculates control command values for operation of rotating each joint part. The calculated control command values are supplied through the D/A board in the input/output IF 24 to the motor driver 25 for driving and controlling the joint parts of the second robot arm 5-2, and motors 43 in the joint parts of the second robot arm 5-2 are driven according to the control command values transmitted from the motor driver 25. Further, the hand 30 is provided with a motor 62 for driving the hand as an example of a hand driving device which is driven and controlled by the motor driver 25 and also is provided with an encoder 61 for detecting the rotational phase angle of the rotation shaft of the hand driving motor 62. Based on the rotational angle detected by the encoder 61, the motor 62 is rotatingly driven and controlled through the motor driver 25 according to control signals from the control part 22 in the control-device main-body part 11, so as to rotate the rotation shaft of the hand driving motor 62 in forward and reverse directions, thereby opening and closing the hand 30.

The second robot arm 5-2 is, for example, a multi-joint robot arm and is a multi-link manipulator with 6 degrees of freedom, and includes the hand 30, a forearm link 32 having, at its tip end, a wrist part 31 provided with the hand 30, an upper arm link 33 which is rotatably coupled at its tip end to the base end of the forearm link 32, and a pedestal part 34 to which the base end of the upper arm link 33 is rotatably coupled and supported. The pedestal part 34 is coupled to the movable rail 8, but it may also be fixed at a certain position. The wrist part 31 has three rotation axes for a fourth joint part 38, a fifth joint part 39, and a sixth joint part 40 and is capable of changing the relative attitude (the orientation) of the hand 30 relative to the forearm link 32. That is, referring to FIG. 2, the fourth joint part 38 can change the relative orientation of the hand 30 relative to the wrist part 31 about a lateral axis. The fifth joint part 39 can change the relative orientation of the hand 30 relative to the wrist part 31 about a vertical axis orthogonal to the lateral axis of the fourth joint part 38. The sixth joint part 40 can change the orientation of the hand 30 relative to the wrist part 31 about a lateral axis which is orthogonal to the lateral axis of the fourth joint part 38 and to the vertical axis of the fifth joint part 39. The other end of the forearm link 32 is made rotatable with respect to the tip end of the upper arm link 33 about a third joint part 37, namely about a lateral axis parallel to the lateral axis of the fourth joint part 38. The other end of the upper arm link 33 is made rotatable with respect to the pedestal part 34 about a second joint part 36, namely about a lateral axis parallel to the lateral axis of the fourth joint part 38. The upper movable part of the pedestal part 34 is made rotatable with respect to the lower fixed part of the pedestal part 34 about a first joint part 35, namely about a vertical axis parallel to the vertical axis of the fifth joint part 39. As a result, the second robot arm 5-2 is made rotatable about a total of six axes, thereby constituting the aforementioned multi-link manipulator with 6 degrees of freedom.

Each of the joint parts constituting the parts rotational about the axes is provided with a motor 43 as an example of a rotational driving device (actually, the motor 43 is provided inside each joint part of the second robot arm 5-2) and also is provided with an encoder 44 for detecting the rotational phase angle of the rotational shaft of the motor 43 (namely, the joint angle) (actually, the encoder 44 is provided inside each joint part of the second robot arm 5-2), wherein the motor 43 is provided in one of a pair of members (for example, a rotation-side member and a support-side member for supporting this rotation-side member) constituting each joint part and also is driven and controlled by the motor driver 25 which will be described later. The rotational shaft of the motor 43 provided in a first member in each joint part is coupled to a second member in each joint part, and the rotational shaft is rotated in forward and reverse directions, so that the second member is rotatable about each axis with respect to the first member.

Reference numeral 41 denotes an absolute coordinate system which has a fixed relatively positional relationship with the lower fixed part of the pedestal part 34, and reference numeral 42 denotes a hand coordinate system which has a fixed relatively positional relationship with the hand 30.

Assuming that the origin position $O_e$ (x, y, z) of the hand coordinate system 42 with respect to the absolute coordinate system 41 is the position of the hand of the second robot arm 5-2; the orientation $(\Phi, \theta, \psi)$ of the hand coordinate system 42 with respect to the absolute coordinate system 41, which is expressed by a roll angle, a pitch angle, and a yaw angle, is the orientation of the hand of the second robot arm 5-2; and a hand position/orientation vector is defined as a vector r=[x, y, z, $\Phi, \theta, \psi]^T$. Accordingly, it is preferred that, for example, the vertical axis of the first joint part 35 is parallel to the z axis of the absolute coordinate system 41, and the lateral axis of the second joint part 36 can be positioned in parallel to the x axis. Further, it is preferred that the lateral axis of the sixth joint part 40 can be positioned in parallel to the x axis of the hand coordinate system 42, the lateral axis of the fourth joint part 38 can be positioned in parallel to the y axis, and the vertical axis of the fifth joint part 39 can be positioned in parallel to the z axis. Further, the rotational angle with respect to the x axis of the hand coordinate system 42 is defined as the yaw angle $\psi$, the rotational angle with respect to the y axis is defined as the pitch angle $\theta$, and the rotational angle with respect to the z axis is defined as the roll angle $\Phi$. In the case of controlling the position and the orientation of the hand of the second robot arm 5-2, the hand position/orientation vector r is caused to follow a hand position/orientation target vector $r_d$ created by a target orbit creation part 55 which will be described later.

The first robot arm 5-1 has the same structure and effects as those of the above-described second robot arm 5-2.

The operation information collection part 23 collects information on an operation and the procedure of the domestic operation, such as information on the procedure of a domestic operation such as recipe information on a cooking operation as an example of the operation, from an information database 16 in an external web server through the Internet 28, and then inputs and stores the information into an operation procedure information database 17 in the operation database 20 by updating it. Further, the operation information collection part 23 collects information on the cooking device 6 such as a microwave oven or an IH cooking heater on a cooking range table (a cooking range table including an IH cooking heater, as an example, in FIG. 1), such as identification information and operation information (for example, cooking periods and heat levels (fire intensities)) about the cooking device 6, and inputs and stores the information into a cooking instrument information database 18 in the operation database 20 by updating it. That is, the operation information collection part 23 collects information required for allowing the person 4 and the robot arms 5 to perform operations in cooperation with each other, in other words, cooperation operation information, from accessible networks, databases, or instruments.

Reference numeral 29 denotes a progress management part for managing information on the progress of the operation stored in a progress information database 19 in the operation database 20. More specifically, as illustrated in FIG. 3, the progress management part 29 reads identification information of the current process, such as a process ID, from the operation database 20, further measures the period required for each process and the clock time for the period, and stores them in the progress information database 19. Further, the data input IF 26 which will be described later is connected to the progress management part 29, and when the person 4 inputs thereto a command describing "the next process" by his or her voice, for example, through a sound input device such as a microphone as an exemplary input from the data input IF 26, the progress management part 29 recognizes, through voice recognition, the fact that the operation can proceed to the next process and stores, in the progress information database 19, flags indicative of whether or not the corresponding processes are the process being currently performed. Also, the person 4 may carry forward the operation of the robot arms 5 to the next process or may stop the operation processes by the robot arms 5, using the data input IF 26 which will be described later.

Reference numeral 26 denotes the data input IF (interface) that is an interface which enables the person 4 to input and change the progress of operations or the information on operations using an input device such as buttons, a key board, a mouse, or a microphone and receives commands for starting and ending operations from the person 4 using, for example, an input device such as buttons on the aforementioned operation panel 13.

Reference numeral 9 denotes the display part that is a display device installed, for example, on the robot arms 5 or on a side surface of the operation table 7 and adapted to display information on operation procedures or information on the current progress.

Next, there will be described details of the operation database 20.

The operation database 20 is structured to include, for example, the operation procedure information database 17 which is information on the procedures of domestic cooperation operations to be performed by the second robot arm 5-2 and the person 4, the progress information database 19 which is information on the progress of the cooperation operations, and the cooking instrument information database 18 which is information on the condition of the cooking device 6 such as an IH cooking heater or a microwave oven operated around the second robot arm 5-2 (cooking instrument information, namely identification information and operation information on the cooking device 6), which are illustrated in FIG. 3.

The information on the procedures of domestic operations which is recorded in the operation procedure information database 17 is structured to include, as exemplified in FIG. 3, operation ID information such as operation ID numbers for identifying the cooperation operations, process ID information such as process ID numbers for identifying the respective processes in the operations, information on the processes corresponding to the process ID numbers, object information on the objects in the processes, operation information for use in performing the processes, expected periods which are periods expected to be taken for the processes, and amount information on the amounts of materials, water, or seasoning to be subjected to cooking in the processes. The object information is, more specifically, information on the objects to be treated in the processes, and for example is information on the ingredients to be used in the processes. The aforementioned operation information is, more specifically, information indicative of which of the person 4, the first robot system 1, and the second robot system 2 should perform the processes and records "1" or "0" in association with the person 4, the first robot system 1, and the second robot system 2. "1" indicates that the person 4, the first robot system 1, or the second robot system 2 performs the operations in the corresponding processes, while "0" indicates that they do not perform the operations. For example, in the process ID0002 in FIG. 3, the operation indicated by the description "Pour 1 liter of water into the pan" ("the operation of pouring water into a pan") is an operation which is performed only by the person 4, and in this case, (1, 0, 0) is stored in the order of (person, robot 1, robot 2).

Further, FIGS. 16A to 16D illustrate states where the person 4, the first robot arm 5-1, and the second robot arm 5-2 perform operations in main processes in FIG. 3.

Figure 16A:
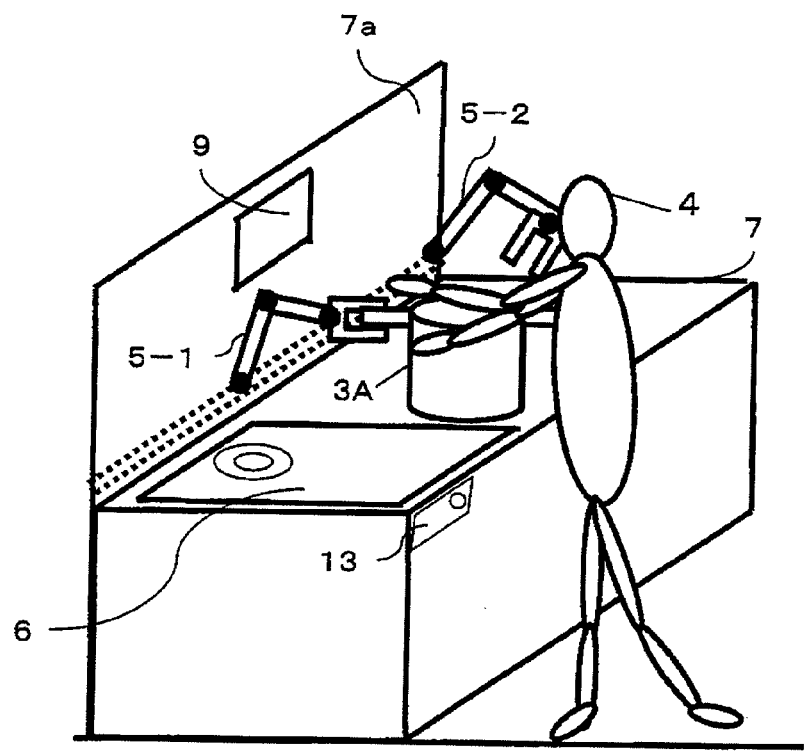
FIG. 16A is a view illustrating a state of a single operation process in a cooking method as an example of operation using the robot arm control device according to the first embodiment.

For example, in the process ID0001, the description "Mount the robot arm 5-1 to a handle of the pan" is provided, and therefore, a state as illustrated in FIG. 16A is realized and, more specifically, the viscosity D and the rigidity K of the first robot arm 5-1 are set to be smaller as will be described later, then the hand 30 of the first robot arm 5-1 is positioned such that it grips one handle of the pair of handles of the pan 3A as an exemplary tool and thereafter the hand 30 is brought into a state where it grasps that one handle.

Figure 16B:
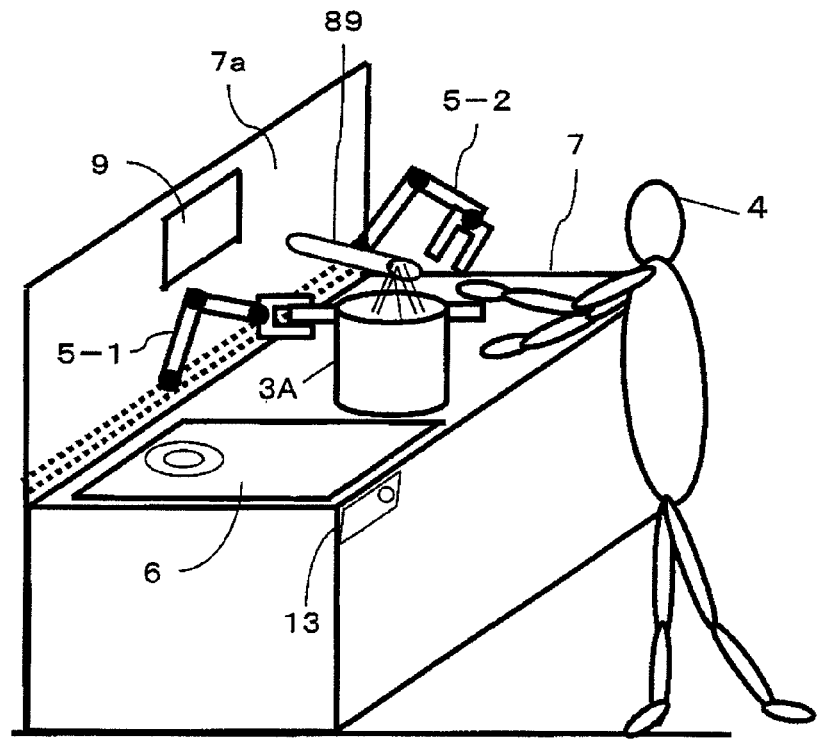
FIG. 16B is a view illustrating a state of an operation process subsequent to FIG. 16A.

In the process ID0002, the description "Pour 1 liter of water into the pan" is provided, and therefore, state as illustrated in FIG. 16B is realized and, more specifically, the viscosity D and the rigidity K of the first robot arm 5-1 are set to be larger as will be described later, and the person 4 pours water in an amount of 1 liter into the pan 3A from a tap 89 in the state where the hand 30 of the first robot arm 5-1 grasps the one handle of the pan 3A.

Figure 16C:
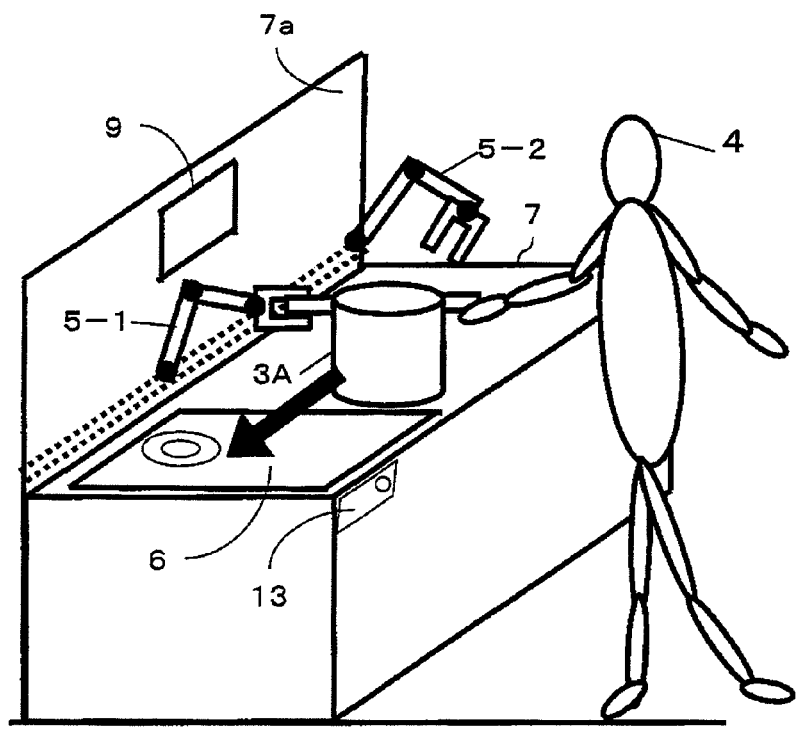
FIG. 16C is a view illustrating a state of an operation process subsequent to FIG. 16B.

Next, in the process 00003, the description "Guide the pan to the cooking range table" is provided, and therefore, a state as illustrated in FIG. 16C is realized, and more specifically, the viscosity D and the rigidity K of the first robot arm 5-1 are set to be larger as will be described later, and in the state where the hand 30 of the first robot arm 5-1 grasps the one handle of the pan 3A and the person 4 grasps the other handle of the pan 3A, the person 4 applies force thereto in the direction toward the cooking range table 6 for exerting this force on the first robot arm 5-1 through the pan 3A, which activates the first robot system 1 as will be described later, thereby causing the first robot arm 5-1 to move along the rail 8 from a position near the tap 89 to the cooking range table 6, so that the first robot arm 5-1 and the person 4 carry the pan 3A in cooperation with each other. In the above-described three processes, the second robot arm 5-2 performs no operation, and therefore, the viscosity D and the rigidity K of the second robot arm 5-2 are set to be larger, and the second robot arm 5-2 is made to stay at a position that does cause interference with the above-described processes, such as a position near the sink.

Figure 16D:
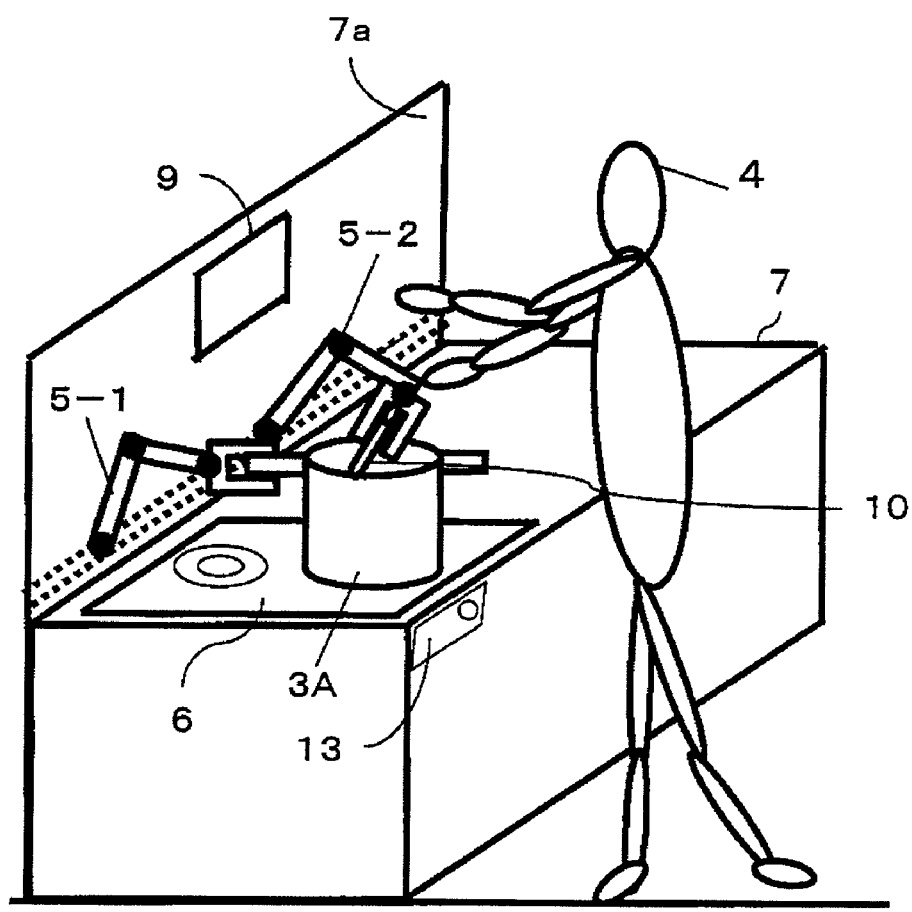
FIG. 16D is a view illustrating a state of an operation process subsequent to FIG. 16C.

Next, in the process 0007, the description "Mount a ladle to the second robot arm 5-2" is provided, and therefore, a state as illustrated in FIG. 16D is realized, and more specifically, the pan 3A is placed on the cooking range table 6, further the viscosity D and the rigidity K of the first robot arm 5-1 are set to be larger, and the person 4 moves to the position at which the second robot arm 5-2 stays while maintaining the state where the hand 30 of the first robot arm 5-1 grasps the one handle of the pan 3A. Then, the person 4 applies force to the second robot arm 5-2 in the direction toward the cooking range table 6, which activates the second robot system 2, thereby causing the second robot arm 5-2 to move along the rail 8 close to the pan 3A on the cooking range table 6. Next, as will be described later, the viscosity D and the rigidity K of the second robot arm 5-2 are set to be smaller, further a ladle 10 is mounted to the hand 30 of the second robot arm 5-2, and the ladle 10 is put into the pan 3A.

Thereafter, although not described in detail, after the processes 0008 to 0029 are performed, in the process 0030 of "End", the operation of the operation ID0001 is completed, and the operations of the first robot arm 5-1 and the second robot arm 5-2 are ended by, for example, pushing buttons on the operation panel 13.

The display part 9 displays information on the procedures of domestic operations in the order of the process ID numbers, and the person 4 and the first and second robot arms 5-1 and 5-2 perform operations in the order of these process ID numbers.

The progress information recorded in the progress information database 19 is structured to include, as exemplified in FIG. 3, the elapsed periods which are the periods actually taken for the respective processes corresponding to the process ID information such as a plurality of process ID numbers associated with operation ID information such as operation ID numbers, information on flags indicative of "1" or "0" which is information for distinguishing whether or not the corresponding operations are the operation being currently performed (for example, the flag "1" indicates that the corresponding operation is the operation being currently performed, while the flag "0" indicates that the corresponding operation is an operation which is not being currently performed), and information on clock time. After the person 4 completes the process displayed on the display part 9, the progress management part 29 waits for the person 4 to inputted, with his or her voice or the like, a command for proceeding to the next process, through the data input IF 26. If a command for proceeding to the next process is input to the progress management part 29 and then the progress management part 29 shifts from the current process to the next process, the progress management part 29 stores information indicating whether or not the corresponding process is the current process, in the progress information database 19. For example, in the process ID0003 in FIG. 3, the flag "1" indicating that the corresponding process is the current process is stored in the progress information database 19 for indicating that this process is the current process. In this case, on the contrary, in association with the other processes, the flag "0" indicating that the corresponding processes are not the current process is stored in the progress information database 19 for indicating that these processes are not the current process. The progress management part 29, on receiving a command for end of the process, measures the period taken to perform this process and then stores the period in the progress information database 19 in the operation database 20. More specifically, the progress management part 29 measures the period during which the flag "1" is stored in association with the current process in FIG. 3 and stores the period as the elapsed period in the progress information database 19. Further, when the cooking device 6 which will be described later is operated, the progress management part 29 may receive a stop signal being inputted thereto from the cooking device 6 at the time when the cooking device 6 is stopped, and the progress management part 29 may automatically shift from the current process to the next process.

The information on the condition of the cooking device 6 (the cooking instrument information) which is stored in the cooking instrument information database 18 is structured to include, as exemplified in FIG. 3, instrument ID information such as instrument ID numbers as exemplary ID information for identifying the cooking device 6 being activated, and information on control ID numbers indicative of operation states of the cooking devices 6 corresponding to these instrument ID numbers, in association with the respective processes corresponding to the process ID information such as a plurality of process ID numbers associated with operation ID information such as operation ID numbers. For example, an instrument ID number "1" illustrated in FIG. 3 indicates an IH cooking heater, and an instrument ID number "2" indicates a microwave oven, a control ID number "1001" as an example of control ID information indicates "heating at 100 degrees C", and a control ID number "2001" indicates "half-thawing for 10 minutes". Further, the information on the condition of the cooking device 6 (the cooking instrument information) is collected by the operation information collection part 23 from the information database 16 in an external web server through the Internet 28 and is stored in the cooking instrument information database 18 in the operation database 20.

Other information such as the information on the procedures of domestic operations or the cooking instrument information may be also collected by the operation information collection part 23 from the information database 16 in the external web server through the Internet 28 and may be stored in the operation procedure information database 17 and the cooking instrument information database 18 in the operation database 20, respectively, as required. This is effective in a case where a new cooking instrument is installed, in a case where an existing cooking instrument is replaced with another cooking instrument, in a case where a new operation should be performed, and the like.

Next, there will be described details of the control parameter setting part 21.

The control parameter setting part 21 makes setting for changing over the respective control modes of the first and second robot arms 5-1 and 5-2 between a position control mode and an impedance control mode (an example of a control mode for causing the robot arms to move according to the force of the person), and also makes setting of mechanical impedance set values for use in the impedance control mode, based on the operation procedure information, the progress information, and the information on the condition of the cooking device 6 (the cooking instrument information).

The position control mode for the first and second robot arms 5-1 and 5-2 is a mode in which the first and second robot arms 5-1 and 5-2 operate based on a hand position/orientation target vector command for the hand 30 from the target orbit creation part 55 which will be described later and, more specifically, is a mode in which the arms operate during stirring operations, wiping cleaning, or other operations.

The impedance control mode for the first and second robot arms 5-1 and 5-2 is a mode in which the first and second robot arms 5-1 and 5-2 operate based on the forces applied to the first and second robot arms 5-1 and 5-2 by the person 4 and the like and is, for example, a mode in which the arms operate, for example, in a case where the person 4 and one or both of the first and second robot arms 5-1 and 5-2 perform carrying operations in cooperation with each other as illustrated in FIG. 1B or in a case where the person 4 directly grasps the first or second robot arm 5-1 or 5-2 and guides the first or second robot arm 5-1 or 5-2 to a position at which operations should be performed as illustrated in FIG. 1A.

Figure 9A:
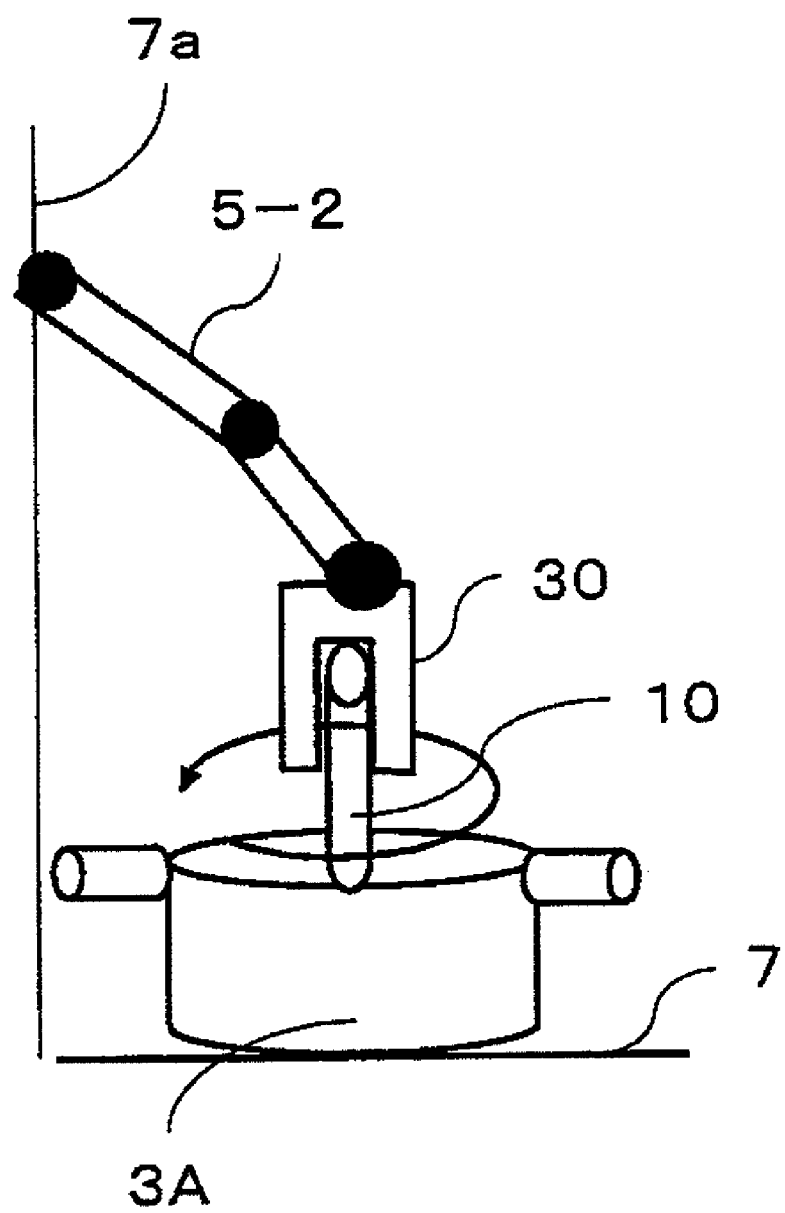
FIG. 9A is a view illustrating a state where the robot arm control device operates, according to the first embodiment of the present invention.

In a case where the person 4, the first robot arm 5-1, and the second robot arm 5-2 perform the cooking operation illustrated in FIG. 3 in cooperation with each other, for example, when the hand 30 of the second robot arm 5-2 performs an operation of stirring the content of the pan 3A as in FIG. 9A in the position control mode according to the instruction of the process ID0008, the person 4 may interrupt the operation of stirring the content of the pan 3A by the hand 30 of the second robot arm 5-2, in order to have a taste of the cooked ingredients in the pan 3A or in order to put a new ingredient into the pan 3A. In such a case, a signal for interrupting the stirring operation is inputted to the operation database 20 and also is inputted to the control parameter setting part 21, through the data input IF 26 from the progress management part 29, by an operation on a button of the operation panel 13. Then, the control parameter setting part 21 outputs, to the control part 22, a command for changeover from the position control mode to the impedance control mode at the stop of the operation.

Figure 9B:
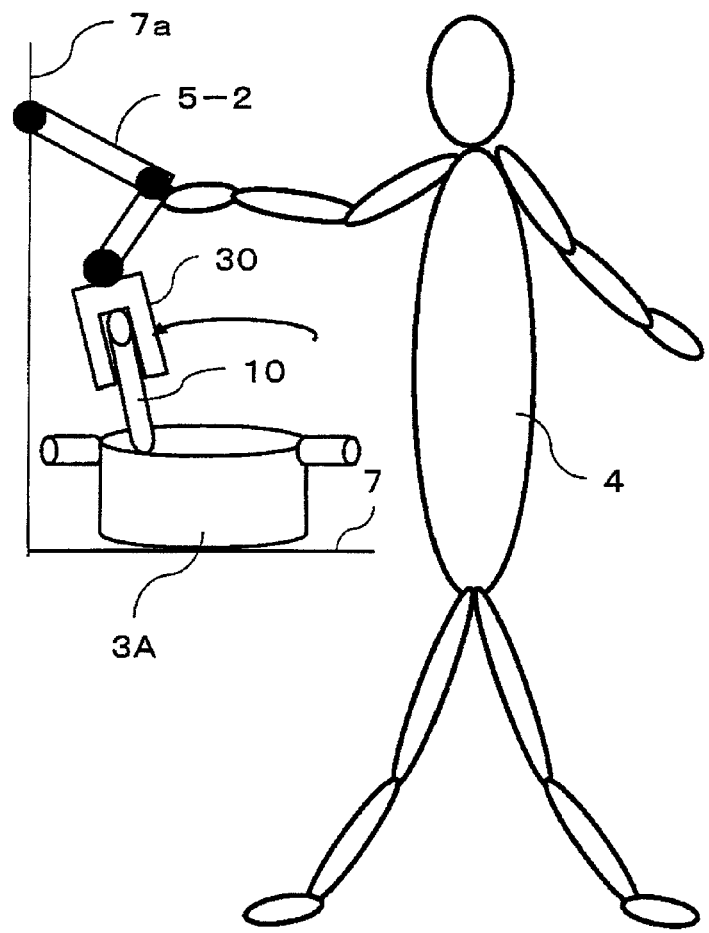
FIG. 9B is a view illustrating a state where the robot arm control device operates, according to the first embodiment of the present invention.

As a result, if the cooking tool 10 grasped by the second robot arm 5-2 stopped according to the interruption command interferes with the tasting of the cooked ingredients in the pan 3A or the putting of an ingredient into the pan 3A, it is possible to change the setting of the control parameter setting part 21 for causing the control part 22 to change over the control mode of the second robot arm 5-2 to the impedance control mode, which enables the person 4 to easily withdraw the second robot arm 5-2 only by directly grasping and making the second robot arm 5-2 move, as illustrated in FIG. 9B.

Further, when the second robot arm 5-2 performs an operation in the impedance control mode in cooperation with the person 4, the control parameter setting part 21 changes correction values for use in correcting the mechanical impedance parameters of the second robot arm 5-2, according to the operation procedure information and the progress information.

The set parameters (the mechanical impedance parameters) for the mechanical impedance set values include inertia M, viscosity D, and rigidity K. The setting of the respective parameters of the mechanical impedance set values is made by the control parameter setting part 21, based on the following evaluation equations, using the correction values.

$$M = KM*(\text{Correction value}) \quad \text{Equation (1)}$$

$$D = KD*(\text{Correction value}) \quad \text{Equation (2)}$$

$$K = KK*(\text{Correction value}) \quad \text{Equation (3)}$$

In the aforementioned equations (1) to (3), KM, KD, and KK are gains, which are certain constant values.

The control parameter setting part 21 outputs, to the control part 22, the inertia M, the viscosity D, and the rigidity K as the mechanical impedance parameters calculated based on the equations (1) to (3).

According to the equations (1) to (3), it is possible to properly operate the robot arms 5 by properly setting the correction values and the like by the control parameter setting part 21. For example, by causing the control parameter setting part 21 to set the viscosity D and the rigidity K of the mechanical impedance parameters of the robot arms 5 to be larger according to the equations (2) and (3), a feeling of resistance or hardness is induced in the movement of the robot arms 5, thereby making it harder to move the robot arms 5. On the other hand, by causing the control parameter setting part 21 to set the viscosity D and the rigidity K of the mechanical impedance parameters of the robot arms 5 to be smaller according to the equations (2) and (3), it is possible to eliminate the feeling of resistance or hardness in the movement of the robot arms 5, which enables smooth movement of the robot arms 5. Further, by causing the control parameter setting part 21 to set the inertia M of the mechanical impedance parameters of the robot arms 5 to be larger according to the equation (1), it is possible to make it necessary to generate larger force for the robot arms 5 to be moved, which prevents the robot arms 5 from being moved even if the robot arms 5 are weakly pushed with a hand. On the other hand, by causing the control parameter setting part 21 to set the inertia M of the mechanical impedance parameters of the robot arms 5 to be smaller according to the equation (1), it is possible to cause the robot arms 5 to be moved with a smaller force, which enables smooth movement of the robot arms 5 only by weakly pushing them with a hand.

Therefore, according to the equations (1) to (3), for example, in the case where the person 4 interrupts a stirring operation as in the process ID0009 in FIG. 3, when the person 4 withdraws the second robot arm 5-2 which interferes with putting of ingredients (more specifically, when the person 4 inputs a command for stopping the stirring operation by the second robot arm 5-2, to the progress management part 29 from the operation panel 13 through the data input IF 26), this command for stopping is inputted from the progress management part 29 to the control parameter setting part 21, and then the control parameter setting part 21 extracts the process ID number that is being currently performed from the operation database 20 and extracts the ingredient (the object information) which is the object corresponding to the extracted process ID number. If the control parameter setting part 21 determines that the ingredient is a material prone to crush such as tofu or a material with a viscosity such as water or a soup, the person 4 is required to quickly withdraw the second robot arm 5-2 for preventing the cooking tool 10 mounted to the hand 30 of the second robot arm 5-2 from accidentally crushing the ingredient or from spattering the water or soup to the outside of the pan 3A to dirty the periphery of the pan 3A. Therefore, the control parameter setting part 21 sets the aforementioned correction values for the mechanical impedance parameters of the second robot arm 5-2 to be larger for setting the viscosity D and the rigidity K of the mechanical impedance parameters of the second robot arm 5-2 to be larger, which induces a feeling of resistance or hardness in the movement of the second robot arm 5-2, thereby making it harder for the second robot arm 5-2 to move. Thereafter, if the person 4 applies force to the second robot arm 5-2 in the direction in which he or she desires to withdraw it and also the person 4 keeps on pushing it, the second robot arm 5-2 can be slowly moved in the direction in which it is desired to be moved, so that the second robot arm 5-2 can be withdrawn, without accidentally crushing the ingredient or spattering the water or soup to the outside of the pan 3A to dirty the periphery of the pan 3A.

Further, in the case where the amount of the ingredient is large, the person 4 is required to apply force for stirring it (namely, in a state where the amount of the ingredient is large, the robot arms 5 are subjected to larger resistance than in the case where the amount of the ingredient is small, and therefore, the person 4 is required to apply force when withdrawing the robot arms 5); therefore, the correction values for the mechanical impedance parameters are set to be smaller for setting the viscosity D and the rigidity K of the mechanical impedance parameters of the second robot arm 5-2 to be smaller, thereby enabling smooth movement of the robot arm 5.

On the other hand, for the robot arm 5 which is not the object to be operated in the operation information associated with the progress information corresponding to the process, the correction values for the mechanical impedance parameters are set to be higher. More specifically, for example, when the operation process has proceeded from the process ID0003 in FIG. 3 for causing the person 4 and the first robot arm 5-1 in the first robot system 1 to carry the pan 3A in cooperation with each other in the impedance control mode to the process ID0004 which is in the state where the carrying has completed, the first robot system 1 is not the object to be operated in the procedure in the process ID0004, and therefore the correction values for the mechanical impedance parameters of the first robot arm 5-1 in the first robot system 1 are set to be larger. Thus, when the first robot arm 5-1 is on standby while grasping the pan 3A in the process ID0004, the inertia M of the mechanical impedance parameters of the first robot arm 5-1 is set to be larger than that in carrying the pan 3A as in the process ID0003. Accordingly, in the process ID0004, a larger force is required for the first robot arm 5-1 on standby to be moved, which prevents the first robot arm 5-1 from being moved even if the first robot arm 5-1 is weakly moved with a hand. Accordingly, when the first robot arm 5-1 is on standby while grasping the handle of the pan 3A, the first robot arm 5-1 can fix the pan 3A such that the pan 3A cannot be easily moved, even if the person 4 tries to move the pan 3A by mistake.

Further, as the operation is carried forward, the person 4 gradually gets tired, gradually causing an increase of false operations or false works. Therefore, with increasing total sum of the elapsed periods of each process which has been determined by the progress management part 29 and inputted to the control parameter setting part 21, the control parameter setting part 21 sets the correction values for the mechanical impedance parameters to be larger. Thus, the rigidity K of the mechanical impedance parameters of the first robot arm 5-1 is set to be larger or the rigidity K of the mechanical impedance parameters of the second robot arm 5-2, in addition to that of the first robot arm 5-1, is set to be larger as required, which can prevent only the first robot arm 5-1 or both the first robot arm 5-1 and the second robot arm 5-2 from being easily moved, thereby eliminating risks of erroneous operation by the person 4 causing fall of the object being carried, such as the pan 3A, in the case of long time operation.

Further, if the carried object is fallen due to erroneous operation, the case in which the pan 3A containing boiled water or ingredients is carried as a result of cooking leads to greater danger than the case in which the pan 3A containing water is carried. Accordingly, the control parameter setting part 21 estimates whether or not the contained ingredient is hot water, from the instrument ID number and the control ID number in the information on the condition of the cooking device 6 which the control parameter setting part 21 has acquired by accessing the operation database 20, such as from the information on the heat level of the IH cooking heater and the operation period thereof. Further, the control parameter setting part 21 sets the correction values for the mechanical impedance parameters to be larger depending on the contained ingredient, based on the operation procedure information. Thus, the viscosity D and the rigidity K of the mechanical impedance parameters of the first or second robot arm 5-1 or 5-2 are set to be larger, which induces a feeling of resistance or hardness in the movement of the first or second robot arm 5-1 or 5-2, thereby making it harder for the first or second robot arm 5-1 or 5-2 to be moved.

Further, when there is a need for quickly preparing a meal such as in morning or evening time zones, as illustrated in FIG. 13, the control parameter setting part 21 sets the correction values for the mechanical impedance parameters in proportion to levels which are set in association with clock time and have been preliminarily stored in the operation database 20. Accordingly, for example, lower levels are set in morning or evening time zones, and this enables setting the correction values for the mechanical impedance parameters of the robot arm 5-1 or 5-2 to be smaller, which can reduce the feeling of resistance or hardness in the movement of the robot arm 5-1 or 5-2, thereby enabling smooth operations thereof.

Figure 5:
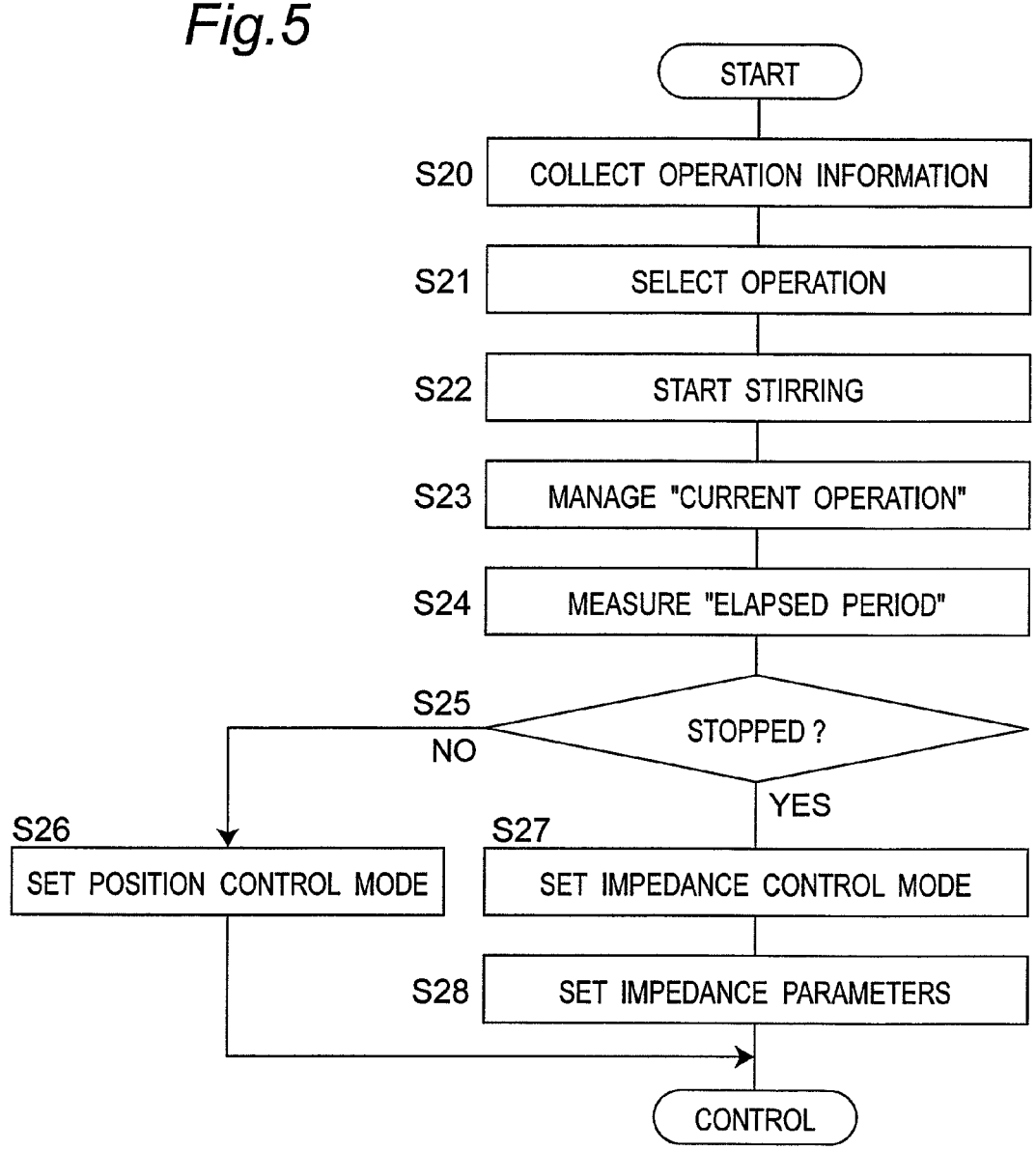
FIG. 5 is a flowchart illustrating the steps of operation of an operation information collection part, an operation database, a control parameter setting part, and a progress management part in the robot arm control device according to the first embodiment of the present invention.

With reference to a flowchart in FIG. 5, there will be described steps of operations by the operation information collection part 23, the operation database 20, the progress management part 29, and the control parameter setting part 21 which have been described above.

The operation information collection part 23 collects information on the procedure of a domestic operation, such as recipe information of a cooking operation, from the information database 16 in the external web server through the Internet 28, and stores the information in the operation procedure information database 17 in the operation database 20 (step S20).

Then, the data input IF 26 sets a current operation in the operation database 20, on receiving from the person 4 a command for selecting an operation from a list of operations displayed on the display part 9. More specifically, the person 4 selects a desired cooking menu from a list of cooking menus and then inputs a command for selection to the operation database 20 through the data input IF 26 for setting the cooking menu as an example of the current operation in the operation database 20 (step S21).

Then, the data input IF 26 receives a command for start of operation from the person 4, according to the operation procedure, namely the operation processes, which is displayed on the display part 9. More specifically, the data input IF 26 receives a command for start of a stirring operation from the person 4 and inputs a command for start of the operation to the progress management part 29 (step S22).

Then, the progress management part 29 manages the progress information on the operation in step S22 and stores the information in the progress information database 19 in the operation database 20. More specifically, the progress management part 29 stores a flag "1" in the progress information database 19 in order to set the stirring operation as "the current operation" (step S23), then the progress management part 29 measures the period during which the flag "1" is stored in "the current operation", and further the progress management part 29 measures the period as the period elapsed during the stirring operation and stores it in the progress information database 19 (step S24).

Then, the control parameter setting part 21 determines whether or not a command for stopping has been inputted by the person 4 from the data input IF 26 through the operation database 20 (step S25).

If the control parameter setting part 21 has not received an input for stopping from the data input IF 26 through the operation databases 20 or from the data input IF 26 through the progress management part 29, the control parameter setting part 21 sets the control mode to the position control mode and outputs the mode to the control part 22, in order to enable stirring operations (step S26).

If the data input IF 26 has received from the person 4 using the data input IF 26 an input for stopping the operation, in order to put another ingredient according to the operation information, in step S25, a signal for stopping is inputted to the control parameter setting part 21 from the data input IF 26 through the operation database 20 or from the data input IF 26 through the progress management part 29, and the control parameter setting part 21 sets the control mode to the impedance control mode (step S27).

Then, the control parameter setting part 21 extracts the current process from the operation database 20, and then calculates the inertia M, the viscosity D, and the rigidity K of the mechanical impedance parameters according to the aforementioned equations (1) to (3) and outputs them to the control part 22, based on the condition of the ingredient used in the operation or the elapsed period and the cooking instrument information on the other cooking device 6 that is being operated in the process (step S28).

Further, although the control parameter setting part 21 sets the position control mode or the impedance control mode according to whether or not there is information of an input for stopping the operation in step S25, the control parameter setting part 21 may also automatically perform changeover between the impedance control mode and the position control mode, based on information from the progress management part 29 and the operation database 20, in the case where a timer or the like is set depending on the expected period information in the recipe information or on the condition of the other cooking device.

Figure 6:
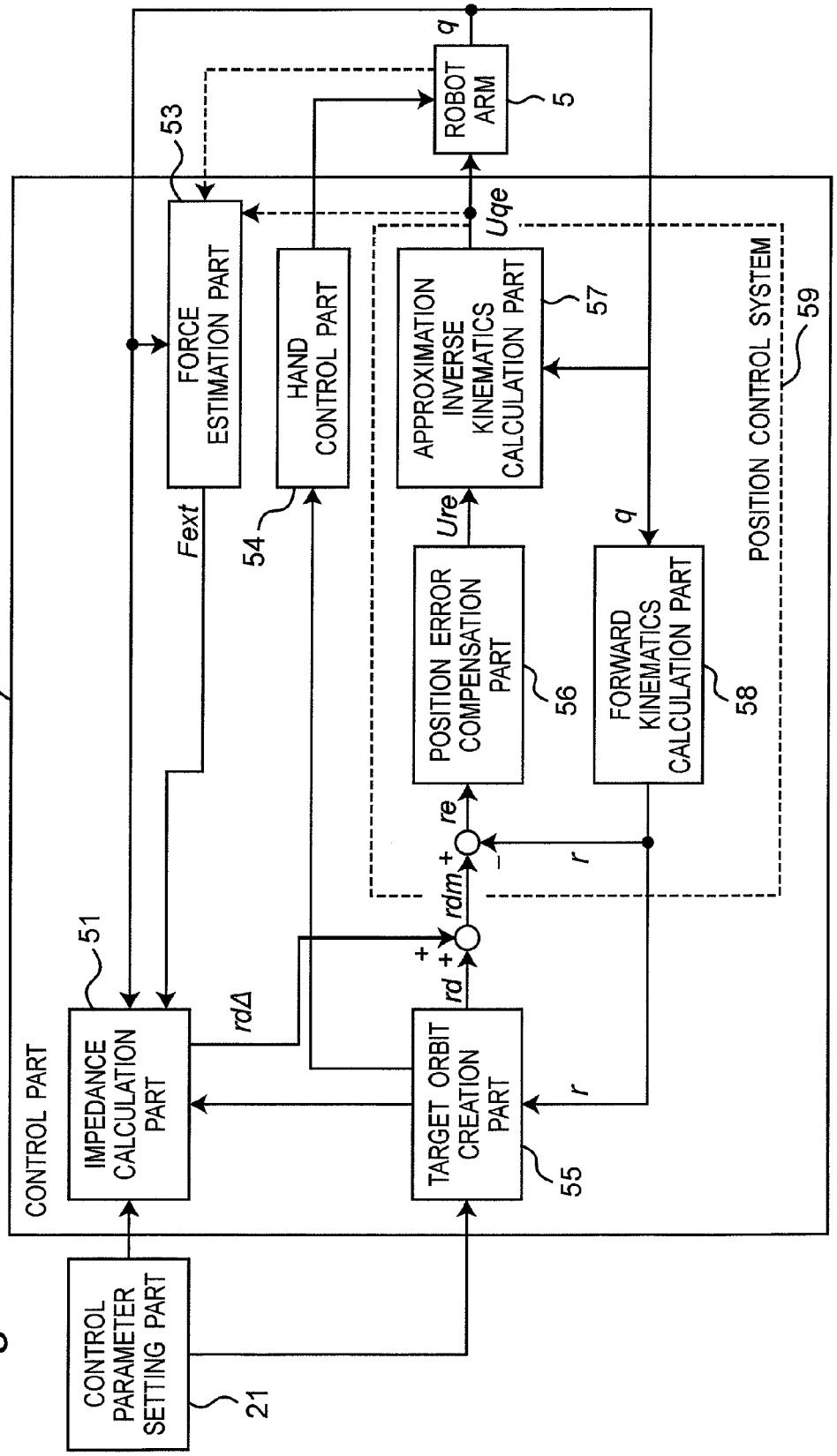
FIG. 6 is a block diagram illustrating the structure of a control part in the robot arm control device according to the first embodiment of the present invention.

FIG. 6 is a block diagram of the control part 22 in the impedance control mode. The control part 22 controls the respective mechanical impedance values of the robot arms 5-1 and 5-2 to the respective mechanical impedance set values of the robot arms 5-1 and 5-2 which have been set based on the set values of the inertia M, the viscosity D, and the rigidity K of the mechanical impedance parameters that have been set by the control parameter setting part 21.

Next, with reference to FIG. 6, there will be described details of the control part 22. A vector $q=[q_1, q_2, q_3, q_4, q_5, q_6]^T$ of the current values of the joint angles (the joint angle vector) determined by the encoders 44 on each of the joint shafts is outputted from the robot arms 5-1 and 5-2 and then is introduced to the control part 22 through the counter board in the input/output IF 24. In this case, $q_1, q_2, q_3, q_4, q_5$, and $q_6$ are the joint angles of the first joint part 35, the second joint part 36, the third joint part 37, the fourth joint part 38, the fifth joint part 39, and the sixth joint part 40, respectively.

Reference numeral 55 denotes the target orbit creation part for outputting a hand position/orientation target vector $r_d$ for use in realizing a target operation of the robot arms 5, on receiving inputs from the control parameter setting part 21. The target operation of the robot arms 5 is preliminarily defined by positions ($r_{do}, r_{d1}, r_2, \ldots$) at respective points in periods ($t=0, t=t_1, t=t_2, \ldots$) according to the target operation, and the target orbit creation part 55 interpolates the orbit between the points to create a hand position/orientation vector $r_d$ using polynomial interpolation.

Reference numeral 53 denotes a force estimation means (a force estimation part) for estimating the external force applied to the robot arms 5 due to the contact between the person 4 and the like and the robot arms 5. The values $i=[i_1, i_2, i_3, i_4, i_5, i_6]$ of the electric currents flowing through the motors 43 which drive the respective joint parts of the robot arms 5, which have been determined by current sensors in a motor driver 27, are introduced to the force estimation means 53 through the A/D board in the input/output IF 24. Further, the current values q of the joint angles are introduced thereto through the counter board in the input/output IF 24, and further, an joint angle error compensation output $u_{qe}$ is introduced thereto from an approximation inverse kinematics calculation part 57 which will be described later. The force estimation means 53 functions as an observer and calculates the torques $\tau_{ext}$ generated in the respective joint parts by the external force applied to the robot arms 5, from the aforementioned electric current values i, the current values q of the joint angles, and the joint angle error compensation output $u_{qe}$. Further, the force estimation means 53 converts them into an equivalent hand external force $F_{ext}$ at the hand of the robot arms 5 according to the equation $F_{ext}=J_v(q)^{-T}\tau_{ext}-[0, 0, mg]^T$ and then outputs it. In this case, $J_v(q)$ is a Jacobian matrix which satisfies the following equation.

$$v=Jv(q)\dot{q}$$

In this case, the equation $v=[v_x, v_y, v_z, \omega_x, \omega_y, \omega_z]^T$ is satisfied, $(v_x, v_y, v_z)$ is the translational velocity of the hand of the robot arms 5 in the hand coordinate system 42, and $(\omega_x, \omega_y, \omega_z)$ is the angular velocity of the hand of the robot arms 5 in the hand coordinate system 42. Further, m is the weight of the object being grasped, and g is the acceleration of gravity of the object being grasped. The value of the weight m of the grasped object may be inputted by the person before the object is grasped or may be inputted by the operation information collection part 23 after the part collects information. Further, by causing the robot arms 5 to actually grasp the object, it is also possible to calculate the value of the weight m of the grasped object based on the result of estimation of the equivalent hand external force $F_{ext}$ by the force estimation means 53 at this time.

An impedance calculation means (impedance calculation part) 51 is a part which has the function of realizing control of the mechanical impedance values of the robot arms 5 to the mechanical impedance set values of the robot arms 5, and outputs "0" when the control parameter setting part 21 has performed changeover to the position control mode. On the other hand, in the impedance control mode, the impedance calculation means (the impedance calculation part) 51 calculates a hand position/orientation target correction output $r_{d\Delta}$ for realizing the control of the mechanical impedance values of the robot arms 5 to the mechanical impedance set values of the robot arms 5 according to the following equation (4), from the inertia M, the viscosity D, and the rigidity K serving as the impedance parameters set by the control parameter setting part 21, the current values q of the joint angles, and the external force $F_{ext}$ estimated by the force estimation part 53 and then outputs it. The hand position/orientation target correction output $r_{d\Delta}$ is added to the hand position/orientation target vector $r_d$ which is outputted from the target orbit creation part 55 to create a hand position/orientation correction target vector $r_{dm}$, $$r_{d\Delta} = (s^2 \hat{M} + s\hat{D} + \hat{K})^{-1} F_{ext} \quad \text{Equation (4)}$$

$$\hat{M} = \begin{bmatrix} M & 0 & 0 & 0 & 0 & 0 \\ 0 & M & 0 & 0 & 0 & 0 \\ 0 & 0 & M & 0 & 0 & 0 \\ 0 & 0 & 0 & M & 0 & 0 \\ 0 & 0 & 0 & 0 & M & 0 \\ 0 & 0 & 0 & 0 & 0 & M \end{bmatrix} \quad \text{Equation (5)}$$

$$\hat{D} = \begin{bmatrix} D & 0 & 0 & 0 & 0 & 0 \\ 0 & D & 0 & 0 & 0 & 0 \\ 0 & 0 & D & 0 & 0 & 0 \\ 0 & 0 & 0 & D & 0 & 0 \\ 0 & 0 & 0 & 0 & D & 0 \\ 0 & 0 & 0 & 0 & 0 & D \end{bmatrix} \quad \text{Equation (6)}$$

$$\hat{K} = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & K & 0 & 0 \\ 0 & 0 & 0 & 0 & K & 0 \\ 0 & 0 & 0 & 0 & 0 & K \end{bmatrix} \quad \text{Equation (7)}$$

In this case, s is a Laplace operator.

Reference numeral 58 denotes a forward kinematics calculation part for receiving the joint angle vector q indicative of the current joint angle values q measured by the encoders 44 on the respective joint shafts in the robot arms 5 through the counter board in the input/output IF 24, and for performing geometric calculations for converting the joint angle vector q of the robot arms 5 into a hand position/orientation vector r.

Reference numeral 56 denotes a position error compensation part for receiving the error $r_e$ between the hand position/orientation vector r and the hand position/orientation correction target vector $r_{dm}$, wherein the hand position/orientation vector r has been calculated by the forward kinematics calculation part 58 from the joint angle vector q measured in the robot arms 5, and the position error compensation part outputs a position error compensation output $u_{re}$ to the approximation inverse kinematics calculation part 57.

The approximation inverse kinematics calculation part 57 performs inverse kinematics approximation calculations according to the approximation equation $u_{out} = J_r(q)^{-1} u_{in}$. In this case, $J_r(q)$ is a Jacobian matrix which satisfies the following relationship.

$$\dot{r} = J_r(q)\dot{q}$$

Further, $u_{in}$ is the input to the approximation inverse kinematics calculation part 57, and $u_{out}$ is the output from the approximation inverse kinematics calculation part 57, and there is provided an equation, as $q_e = J_r(q)^{-1} r_e$, for converting the hand position/orientation error $r_e$ into a joint angle error $q_e$, assuming that the input $u_{in}$ is the joint angle error $q_e$. Accordingly, when a position error compensation output $u_{re}$ is inputted to the approximation inverse kinematics calculation part 57, then the approximation inverse kinematics calculation part 57 outputs, as an output, a joint angle error compensation output $u_{qe}$ for compensating for the joint angle error $q_e$.

The joint angle error compensation output $u_{qe}$ is supplied as a voltage command value to the motor driver 25 through the D/A board in the input/output IF 24, and the motors 43 drive the respective joint shafts for rotating the shafts in the forward and reverse directions for operating the robot arms 5.

There will be described the principle of the impedance control operation for the robot arms 5, regarding the control part 22 having the above-described structure.

The fundamental of the impedance control operation is feedback control (position control) over the hand position/orientation error $r_e$ through the position error compensation part 56, and the portion enclosed by a dotted line in FIG. 6 forms a position control system 59. By using, for example, a PID compensation device as the position error compensating part 56, the control functions for converging the hand position/orientation error $r_e$ to 0, thereby realizing target impedance control operation for the robot arms 5.

If the control parameter setting part 21 performs changeover to the impedance control mode, the impedance calculation means 25 adds the hand position/orientation target correction output $r_{d\Delta}$ to the aforementioned position control system 59 for correcting the target value of the hand position/orientation. This causes the target value of the hand position/orientation in the position control system 59 to slightly deviate from the original value, and consequently the control of the mechanical impedance values of the robot arms 5 to the properly defined set values is realized. Since the hand position/orientation target correction output $r_{d\Delta}$ is calculated according to the equation (4), it is possible to realize operation for controlling the inertia M, the viscosity D, and the rigidity K of the mechanical impedance values of the robot arms 5 to the properly defined set values.

Figure 7:
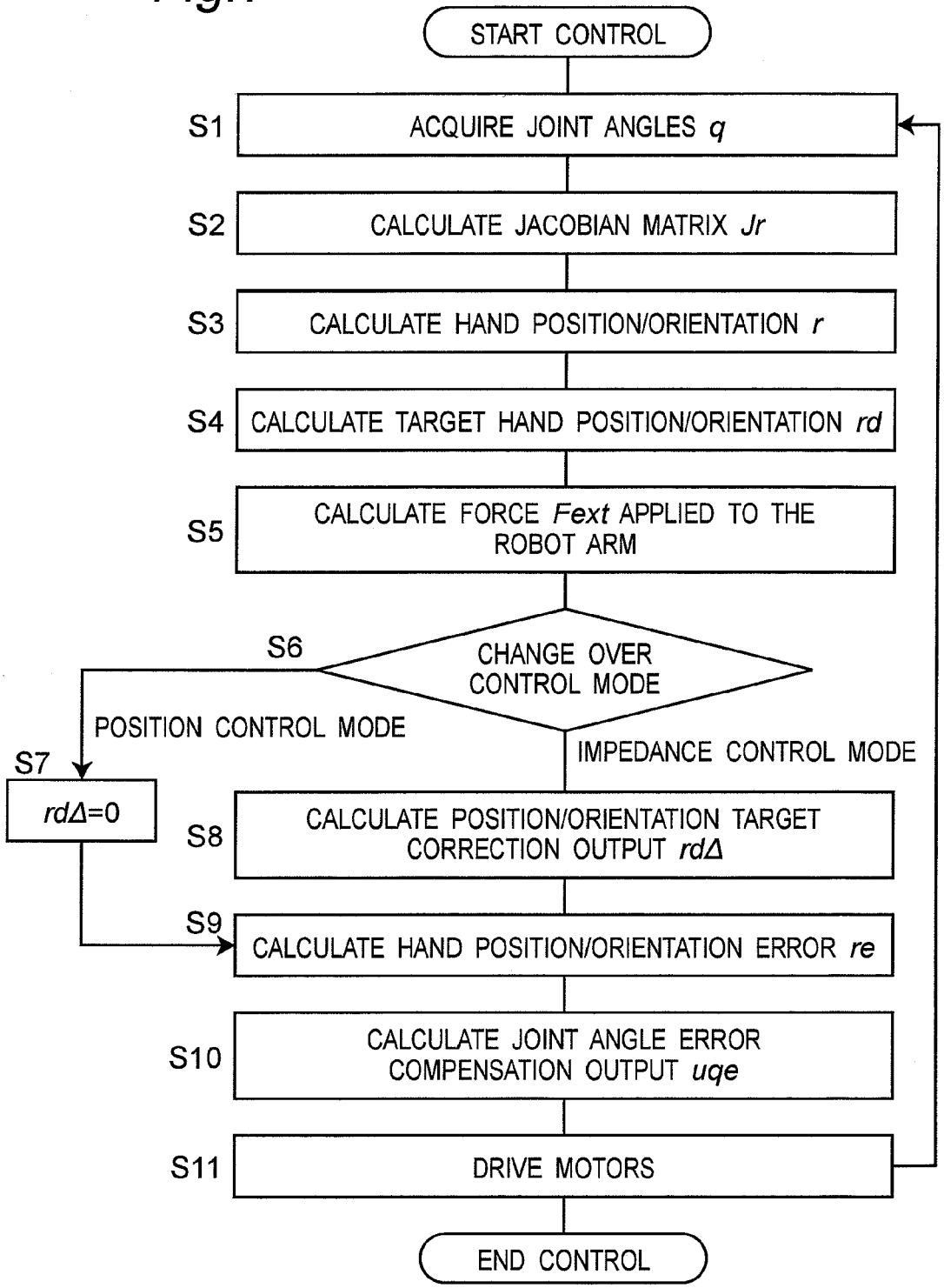
FIG. 7 is a flowchart illustrating the steps of operation of the control part in the robot arm control device according to the first embodiment of the present invention.

There will be described the steps of actual operation of a control program based on the above-described principle based on a flowchart in FIG. 7.

The joint angle data (the joint variable vector or the joint angle vector q) measured by the respective encoders 44 in the joint parts is introduced to the control-device main-body part 11 (step S1).

Next, the inverse kinematics calculation part 57 performs calculations for a Jacobian matrix $J_r$ or the like which are necessary for kinematics calculations for the robot arms 5 (step S2).

Next, the forward kinematics calculation part 58 calculates a current hand position/orientation vector r of the robot arms 5, from the joint angle data (the joint angle vector q) from the robot arms 5 (step S3).

Next, the target orbit calculation part 55 calculates a hand position/orientation target vector $r_d$ for the robot arms 5, based on an operation program for the robot arms 5 which has been preliminarily stored in a memory (not illustrated) in the control-device main-body part 11 (step S4).

Next, the force estimation part 53 calculates an equivalent hand external force $F_{ext}$ at the hand of the robot arms 5, from the values i of the driving electric currents in the motors 43, the joint angle data (the joint angle vector q), and the joint angle error compensation output $u_{qe}$ (step S5).

Next, in step S6, the control parameter setting part 21 sets the position control mode or the impedance control mode and, in the case of the position control mode, the processing proceeds to step S7 and, in the case of the impedance control mode, the processing proceeds to step S8.

Next, in step S7 (the processing by the impedance calculation part 51), in the case where the control parameter setting part 21 has set the position control mode, the impedance calculation part 51 sets the hand position/orientation target correction output $r_{d\Delta}$ to 0 vector. Thereafter, the processing proceeds to step S9.

Next, when the control parameter setting part 21 has set the impedance control mode in step S6, the impedance calculation part 51 calculates the hand position/orientation target correction output $r_{d\Delta}$, from the inertia M, the viscosity D, and the rigidity K of the mechanical impedance parameters set by the control parameter setting part 21, the joint angle data (the joint angle vector q), and the equivalent hand external force $F_{ext}$ applied to the robot arms 5 which has been calculated by the force estimation part 53 (step S8).

Next, the position error compensation part 56 calculates the hand position/orientation error $r_e$ which is the difference between the hand position/orientation correction target vector $r_{dm}$ that is the sum of the hand position/orientation target vector $r_d$ and the hand position/orientation target correction output $r_{d\Delta}$ and the current hand position/orientation vector r (step S9). As a specific example of the position error compensation part 56, it is possible to employ a PID compensation device. By properly adjusting the three gains for the proportion, the derivation, and the integration which are diagonal matrices of constant values, the control functions to converge the position error to 0.

Next, the approximation inverse kinematics calculation part 57 multiplies the position error compensation output $u_{re}$ by an inverse matrix of the Jacobian matrix $J_r$ calculated in step S2 for converting the position error compensation output $u_{re}$ having values relating to the hand position/orientation error into an joint angle error compensation output $u_{qe}$ having values relating to the joint angle error (step S10).

Next, the joint angle error compensation output $u_{qe}$ is supplied through the D/A board in the input/output IF 24 from the approximation inverse kinematics calculation part 57 to the motor driver 25, which changes the amounts of electric currents flowing through each of the motors 43 for generating operation for rotating the respective joint shafts in the robot arms 5 (step S11).

The aforementioned steps S1 to S11 are repeatedly performed as a calculation loop for the control, and consequently, the control over the operation of the robot arms 5, namely operations for controlling the mechanical impedance values of the robot arms 5 to the aforementioned properly defined set values, is realized.

Through the aforementioned operation steps S20 to S28 and steps S1 to S11, it is possible to set the control parameters according to the operation procedure information and the progress information on the operations and further according to the condition of the cooking device 6 that is being operated around the robot arms 5 during the processes in the operations, and it is further possible to realize operations of the robot arms 5 according to these parameters.

Since there are provided the operation database 20, the control parameter setting part 21, the progress management part 29, and the control part 22 as described above, in the case where the person 4 operates the robot arms 5, the person 4 can cause the robot arms 5 to quickly move when the person 4 desires to move the robot arms 5. Furthermore, it is possible to perform transition from an impedance control state which provides lower rigidity to an impedance control state which provides higher rigidity, based on the condition of the ingredients subjected to the operations, which can prevent the ingredients from being crushed or being spattered to the outside of the pan due to false operation of the robot arms 5 by the person 4.

Further, the person 4 gradually gets tired by prolonged operation period, which increases the possibility of false operation of the robot arms 5. Therefore, by causing transition from an impedance control state which provides lower rigidity to an impedance control state which provides higher rigidity according to the elapsed period, it is possible to prevent occurrence of false operation of the robot arms 5 due to fatigue.

Second Embodiment

A control device 105 for a robot arm 5 according to a second embodiment of the present invention has a basic structure similar to that of the first embodiment, and therefore, only the parts different therefrom will be described in detail hereinafter, while the same parts will not be described.

Figure 8:
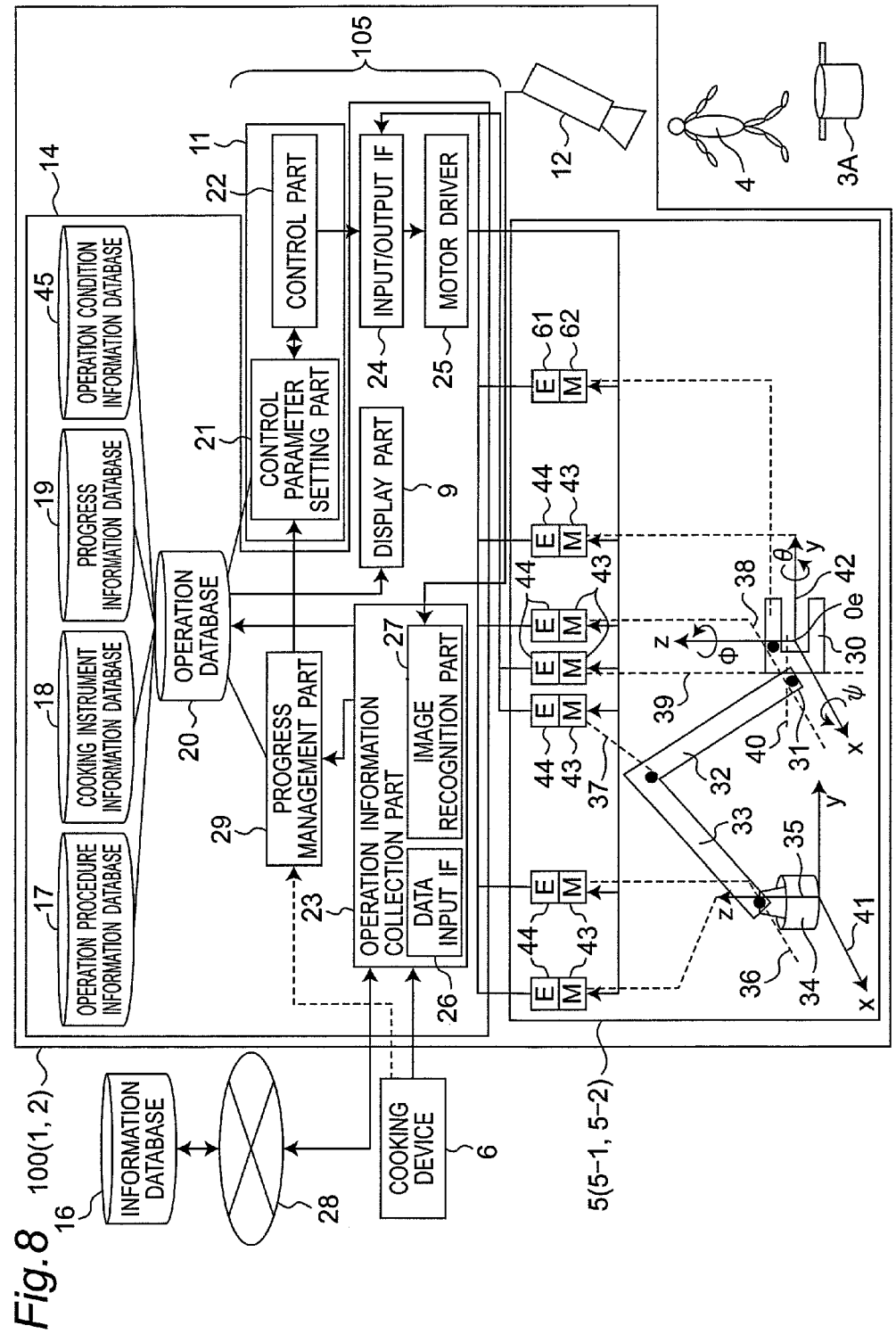
FIG. 8 is a view illustrating the detailed structures of the robot arm control device and the robot arm to be controlled, which are constituents of a robot system according to a second embodiment of the present invention.

FIG. 8 is a view illustrating the detailed structures of a control device 105 and the robot arm 5 (the first or second robot arm 5-1 or 5-2) to be controlled thereby, which constitute the first robot system 1 or the second robot system 2.

The input/output IF 24, the motor driver 25, the robot arm 5, the control part 22, the progress management part 29, and the display part 9 are the same as those of the first embodiment and will not be described.

Information on a characteristic of a person 4 who cooperates with the robot arm 5, such as information on the dominant arm of the person 4 (for example, information on an operational characteristic), is inputted through a data input IF 26 in an operation information collection part 23 and is stored in an operation condition information database 45 in an operation database 20.

Further, an image recognition part 27 in the operation information collection part 23 performs image recognition on image data from an image pickup device 12, such as a camera, which captures images of a state where the person 4 and the robot arm 5 perform an operation in cooperation with each other to collect information on the position of the person 4 who is operating the robot arm 5 or information indicative of whether or not the person 4 grasps a cooking tool 10 or the like at his or her hand, and then outputs the information to the operation condition information database 45 in the operation database 20.

Next, there will be described details of the operation database 20.

The operation database 20 is structured to include, for example, an operation procedure information database 17 and a progress information database 19 for the robot arm 5 and the person 4 as illustrated in FIG. 3, and an operation condition information database 45 which has preliminarily stored information on states of cooperation operations by the person 4 who operates the robot system 1 or 2 as illustrated in FIG. 4. FIG. 3 is the same as that of the first embodiment and will not be described.

As illustrated in FIG. 4, the information on the conditions of operations by the person 4 is structured to include, for example, an ID number as exemplary human identification information for identifying the person 4 and information on the age, the gender, and the name of the person 4 corresponding to the ID number and also include information indicative of the positions of the hand of the dominant arm of the person 4 and indicative of whether or not the person 4 grasps a cooking tool 10 or the like with his or her dominant arm, information on the dominant arm of the person 4, and skill information indicative of the abilities of the person 4 for carrying out operations. These kinds of information have been preliminarily acquired based on measurement and evaluation and have been stored as a database in the operation database 20.

The identification of the person 4 can be achieved by attaching an RF tag to the person 4 and extracting an identification number as an ID number therefrom or by causing the person 4 to input an identification number (ID number) to the operation database 20 through the data input IF 26 before the commencement of an operation. Further, the information on the dominant arm of the person 4 can be inputted to the operation database 20 through the data input IF 26 by the person 4 before the commencement of an operation. Further, the image recognition part 27 performs processing of model matching between image data from the image pickup device 12 such as a camera and image data of the hand of the person 4 which has been preliminarily recorded, then the image recognition part 27 extracts the position of the hand of the person 4, then the image recognition part 27 calculates the position of the grasped object after an RFID tag is attached to the grasped object, and then the image recognition part 27 determines that the person is grasping the object when the position of the grasped object overlaps with the position of the hand.

The skill information of the person 4 is constituted by an operation ID number and a skill level and indicates in five stages, as the level, his or her ability to carry out the operation indicated by the operation ID number. A "level 1" indicates a lowest skill level, and a "level 5" indicates a highest skill level. For example, in FIG. 4, an ID number 2 indicates a child of 10 years old, and the level 1 is defined in association with the cooking operation indicated by the operation ID0001, indicating that his or her ability to carry out the cooking operation is low. The skill information is inputted to the operation database 20 through the data input IF 26 by the person 4 before the commencement of an operation.

The control parameter setting part 21 sets the control parameters for the robot arm 5, based on the operation procedure information, the progress information, and the state of an operation by the person 4. For example, in a case where the person 4 performs the cooking operations illustrated in FIG. 3, when the second robot arm 5-2 performs a stirring operation in the position control mode according to the instruction in the process ID0008, the person 4 may interrupt the stirring operation in order to have a taste of the cooked ingredients in the pan 3A or in order to put a new ingredient into the pan 3A. In such a case, a command for stopping is inputted through the data input IF 26, and the command for stopping is inputted to the control parameter setting part 21 through the progress management part 29 and the operation database 20 or directly from the progress management part 29, and then, the control parameter setting part 21 stops the operation of the second robot arm 5-2 through the control part 22, and also the control parameter setting part 21 sets parameters for withdrawing the second robot arm 5-2 to a proper position based on the state of the operation by the person 4 which will be described later, when the operation is stopped.

Figure 10A:
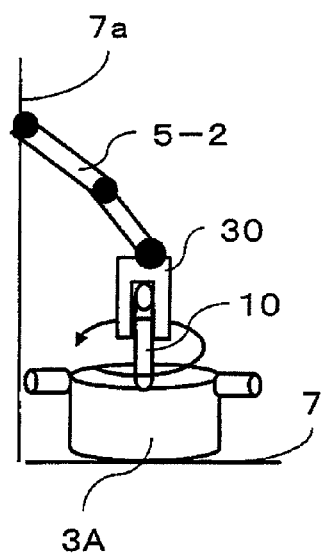
FIG. 10A is a view illustrating a state where the robot arm control device operates, according to the second embodiment of the present invention.
Figure 10B:
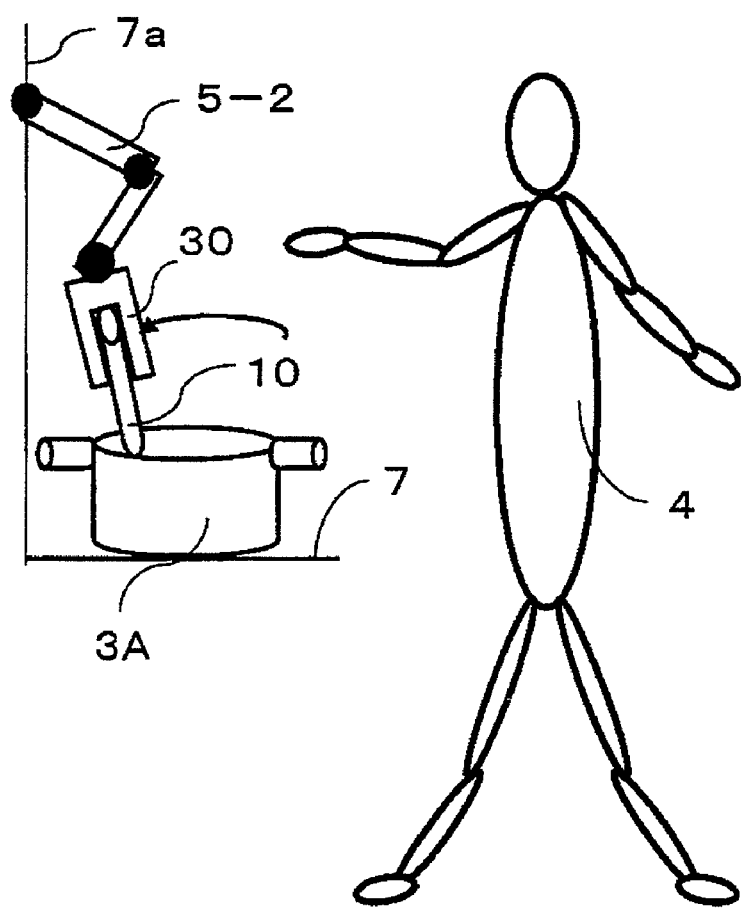
FIG. 10B is a view illustrating a state where the robot arm control device operates, according to the second embodiment of the present invention.

More specifically, at the position in FIG. 10A (in a state where the cooking tool 10 grasped by the hand 30 of the second robot arm 5-2 is positioned in a center portion of the pan 3A), if a command for stopping is inputted to the data input IF 26 by the person 4, then the aforementioned command for stopping is inputted to the control parameter setting part 21 from the data input IF 26 through the progress management part 29, and the control parameter setting part 21 stops the stirring by the second robot arm 5-2 through the control part 22, the second robot arm 5-2 or the cooking tool 10 such as a ladle attached thereto interferes with an operation of having a taste and the like by the person 4, at the position of FIG. 10A. Therefore, the control parameter setting part 21 recognizes that the stirring operation has been interrupted by the aforementioned command for stopping, from the operation procedure information acquired from the progress management part 29 and the operation database 20 and therefore estimates the position of the person 4 from the position of the hand of the person 4 in FIG. 4, based on the information on the result of the image recognition which has been acquired from the image recognition part 27 through the operation database 20, and sets a target orbit to a withdraw position to which the second robot arm 5-2 should be withdrawn in a direction toward a position where the person 4 is not present (for example, a withdraw position where the cooking tool 10 grasped by the hand 30 of the second robot arm 5-2 is positioned in the vicinity of the pan 3A and near the wall surface 7a), as in FIG. 10B. The target orbit is information indicative of positions ($r_{do}$, $r_{d1}$, $r_{d2}$, . . . ) at points in periods (t=0, t=$t_1$, t=$t_2$, . . . ), and the control parameter setting part 21 calculates the target orbit from the position of the person 4 to output the orbit to the control part 22, as in the first embodiment. The control part 22 withdraws the second robot arm 5-2 to a predetermined position in the position control mode based on calculated data from the control parameter setting part 21.

Further, the control parameter setting part 21 can set parameters for withdrawing the second robot arm 5-2 to a more proper position, based on the information on the dominant arm of the person 4 in FIG. 4 and the operation procedure information.

Figure 14A:
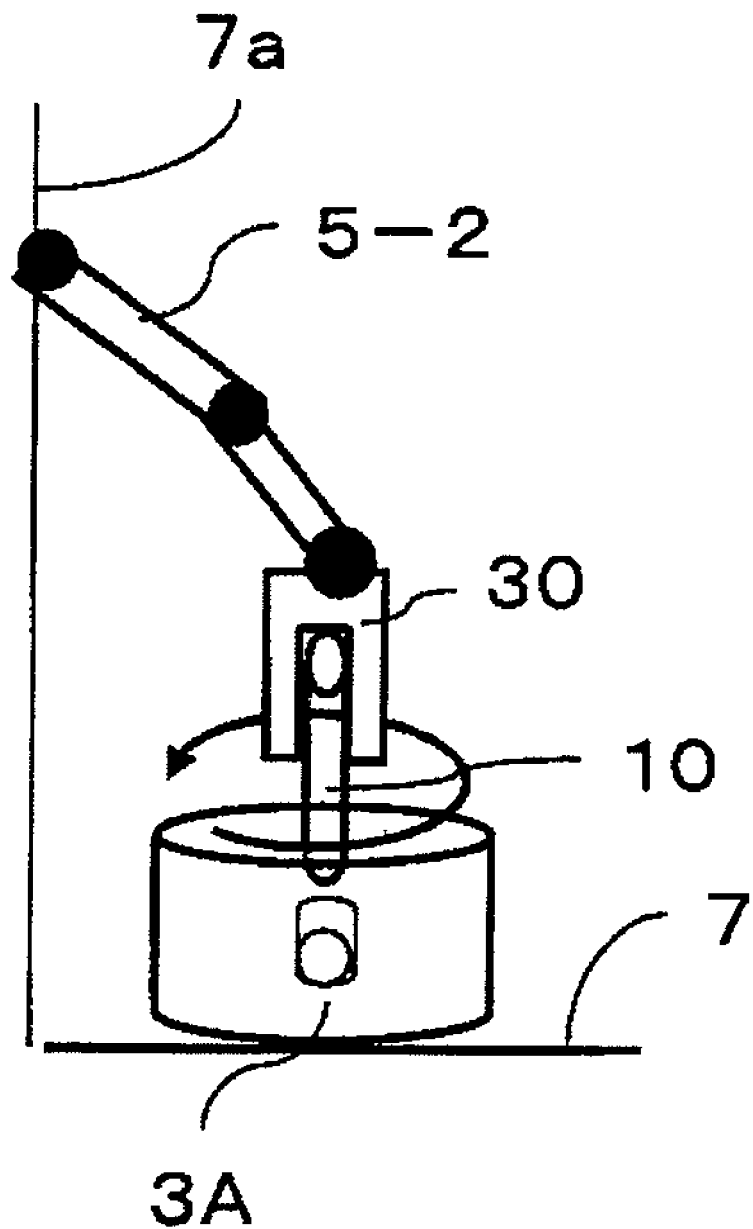
FIG. 14A is a view illustrating a state where the robot arm control device operates, according to the second embodiment of the present invention.
Figure 14B:
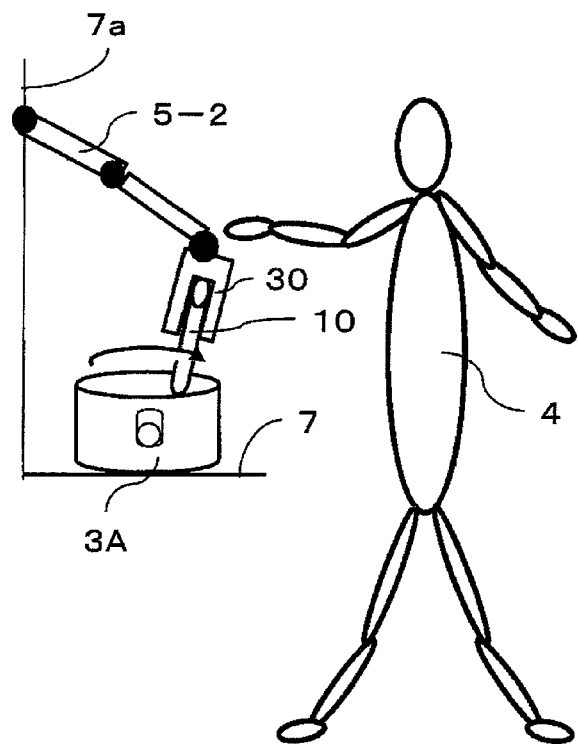
FIG. 14B is a view illustrating a state where the robot arm control device operates, according to the second embodiment of the present invention.
Figure 14C:
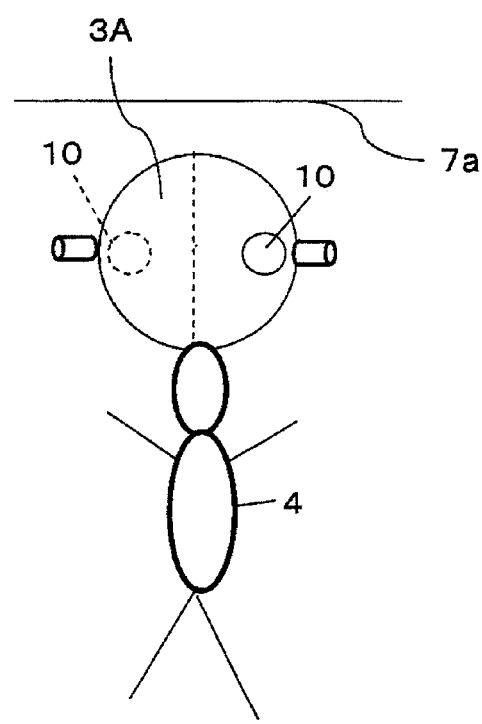
FIG. 14C is a plan view illustrating a state where the robot arm control device operates, corresponding to FIG. 14B, according to the second embodiment of the present invention.

More specifically, for example, when a stirring operation is interrupted, at the position in FIG. 14A, the second robot arm 5-2 or the cooking tool 10 such as a ladle attached to the hand 30 thereof interferes with an operation of having a taste and the like by the person 4. In this case, as illustrated in FIG. 14B and FIG. 14C, in a case where the person 4 is right-handed (in a case where the dominant arm of the person 4 is the right arm), it is possible to set a target orbit to a withdraw position to which the cooking tool 10 mounted to the hand 30 of the second robot arm 5-2 is to be withdrawn on the right side with respect to a central dotted line in the pan 3A when viewed from the person 4, in order to facilitate the operation in the next process (see a solid line circle in FIG. 14C). On the contrary, in a case where the person 4 is left-handed (in a case where the dominant arm of the person 4 is the left arm), it is possible to set a target orbit to a withdraw position to which the cooking tool 10 mounted to the hand 30 of the second robot arm 5-2 is to be withdrawn on the left side with respect to the central dotted line in the pan 3A when viewed from the person 4, in order to facilitate the operation in the next process (see a dotted line circle in FIG. 14C).

Further, it is possible to set parameters for use in withdrawing the second robot arm 5-2 to a more proper position, based on the information on the state of grasping by the hand of the person 4.

Figure 15A:
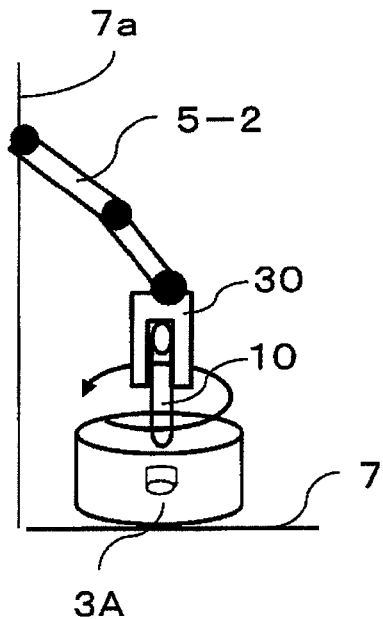
FIG. 15A is a view illustrating a state where the robot arm control device operates, according to the second embodiment of the present invention.
Figure 15B:
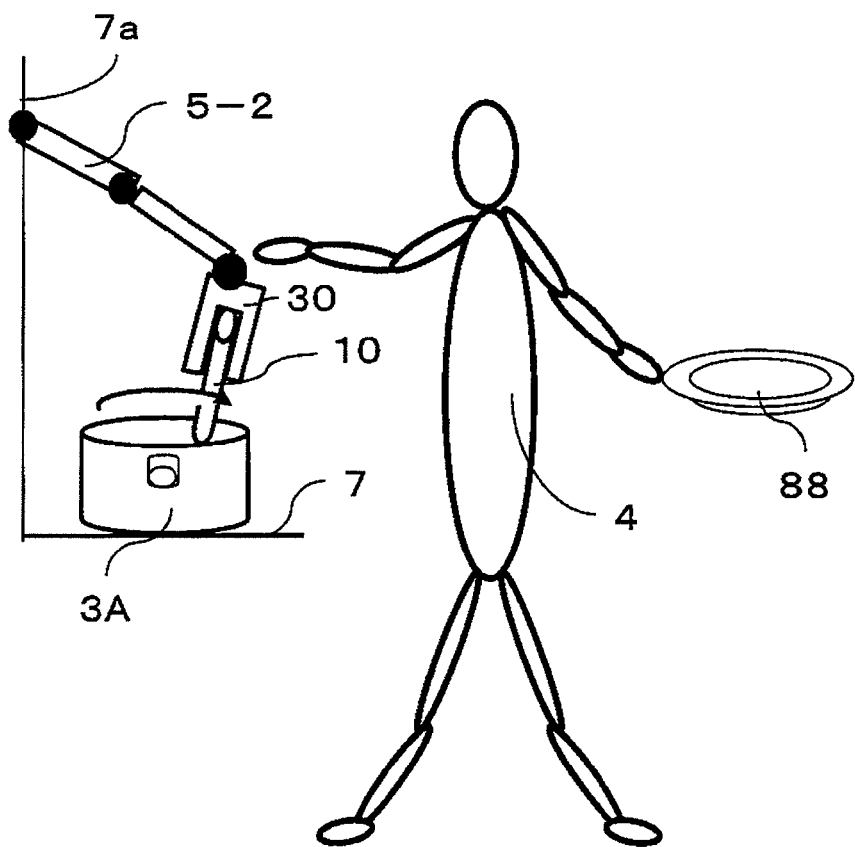
FIG. 15B is a view illustrating a state where the robot arm control device operates, according to the second embodiment of the present invention.
Figure 15C:
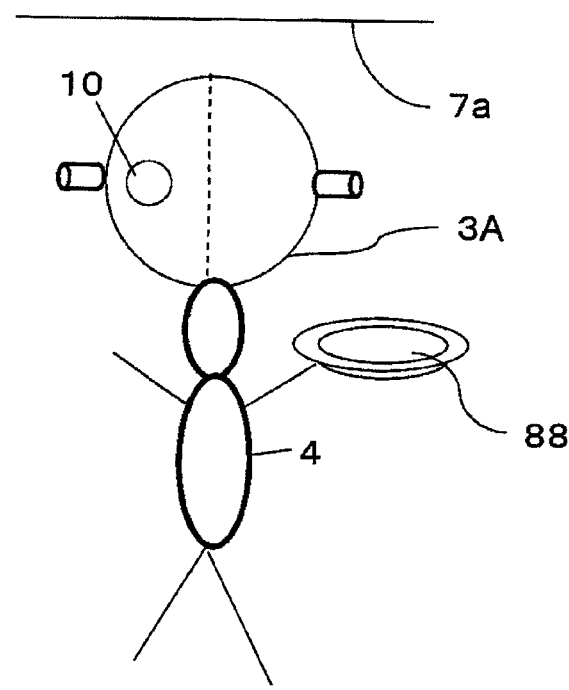
FIG. 15C is a plan view illustrating a state where the robot arm control device operates, corresponding to FIG. 15B, according to the second embodiment of the present invention.

More specifically, for example, when a stirring operation is interrupted, at the position in FIG. 15A, the second robot arm 5-2 or the cooking tool 10 such as a ladle attached to the hand 30 thereof interferes with an operation of putting a new ingredient and the like by the person 4. In this case, as illustrated in FIG. 15B and FIG. 15C, it is possible to set a target orbit to a withdraw position to which the cooking tool 10 mounted to the hand 30 of the second robot arm 5-2 is to be withdrawn in a direction toward the hand of the person 4 which is not grasping a dish 88 on which the new ingredient is placed (on the left side with respect to the central dotted line in the pan 3A when viewed from the person 4) (see a solid line circle in FIG. 15C).

Further, it is possible to set parameters for use in withdrawing the second robot arm 5-2 to a more proper position, based on the skill information of the person 4.

More specifically, for example, in the case of a child having a lower skill in the cooking operation, a target orbit for the operation of withdrawing the second robot arm 5-2 is set in such a way as to realize a slower operation than that for adults having higher skills. For example, the target orbit is information indicative of positions ($r_{do}$, $r_{d1}$, $r_{d2}$, ...) at points in periods ($t=0$, $t=t_1$, $t=t_2$, ...) as in the first embodiment, and therefore, it is possible to cause the control parameter setting part 21 to set the periods ($t=0$, $t=t_1$, $t=t_2$, ...) to larger values than those for adults. By doing this, it is possible to withdraw the second robot arm 5-2 through a slower operation than that for adults, thereby realizing safety for the child.

Further, when the second robot arm 5-2 is withdrawn at the time when a stirring operation by a child having a lower skill is interrupted, the control parameter setting part 21 can be caused to set the correction values in the equations (1) to (3) to be larger, thereby setting the viscosity D and the rigidity K to be larger. By doing this, a feeling of resistance or hardness is induced in the movement of the second robot arm 5-2, which makes it harder to cause the second robot arm 5-2 to move, thereby preventing the child from rapidly moving the second robot arm 5-2 by mistake to crush ingredients or spatter water or soup to the outside of the pan 3A by mistake.

As described above, the control parameter setting part 21 can set the control parameters based on the information on the state of the operations by the person 4 which is stored in the operation condition information database 45 or the information acquired by the image recognition part 27, which enables withdrawing the second robot arm 5-2 to a position which allows the person 4 to easily perform operations. This can provide the robot arm 5 and the control device 105 for the robot arm 5 with excellent usability.

Third Embodiment

A control device 105 for the robot arm 5 according to a third embodiment of the present invention has a basic structure similar to those of the first embodiment and the second embodiment, and therefore, only the parts different therefrom will be described in detail hereinafter, while the same parts will not be described.

Figure 11:
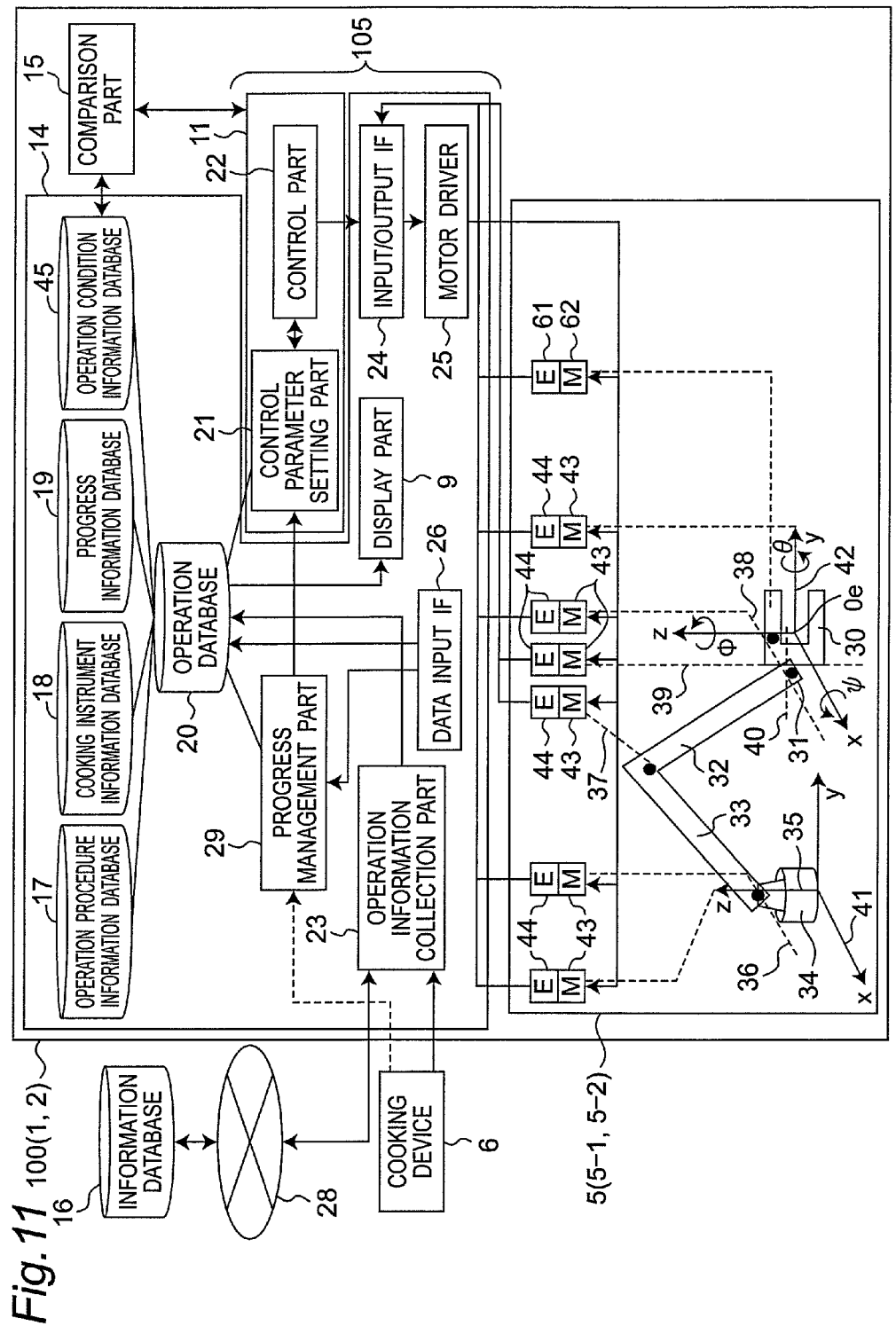
FIG. 11 is a view illustrating the detailed structures of a control device and a robot arm to be controlled, which are constituents of a robot system according to a third embodiment of the present invention.

FIG. 11 is a view illustrating the detailed structures of the robot arm 5 to be controlled and the control device 105 therefor, which constitute the first robot system 1 or the second robot system 2.

The input/output IF 24, the motor driver 25, the robot arm 5, the progress management part 29, the display part 9, and the operation information collection part 23 are the same as those of the first embodiment and will not be described.

In a case where the cooking operation illustrated in FIG. 3 is performed, when the second robot arm 5-2 performs a stirring operation in the position control mode according to the instruction in the process ID0008 as in FIG. 9A, the person 4 may interrupt the stirring operation in order to have a taste of the cooked ingredients in the pan 3A or in order to put a new ingredient into the pan 3A. In such a case, a command for stopping is inputted through the data input IF 26, and the command for stopping is inputted to the control parameter setting part 21 through the progress management part 29, then the control parameter setting part 21 stops the operation of the second robot arm 5-2 through the control part 22, and also, the control parameter setting part 21 outputs, to the control part 22, a command for changing over the control mode of the second robot arm 5-2 from the position control mode to the impedance control mode, at the stop of the operation.

Based on this output, the control part 22 changes over the control mode of the second robot arm 5-2 from the position control mode to the impedance control mode at the stop of the operation, and thereafter, if the person 4 applies force to the second robot arm 5-2, then the second robot arm 5-2 moves in the direction in which this force is applied. Accordingly, as illustrated in FIG. 1A, the person 4 can move the second robot arm 5-2 to a withdraw position at which the arm does not interfere with operations of having a taste or putting a new ingredient, by directly grasping the second robot arm 5-2 and applying force thereto in the direction in which he or she desires to withdraw the arm. In this case, as illustrated in FIG. 12, the control parameter setting part 21 stores the force applied by the person 4 (the magnitudes of the force are illustrated in the center field of FIG. 12, wherein larger numbers indicate larger magnitudes of force), and the position of the hand 30 of the second robot arm 5-2, namely the hand position and a target position at that time (orientation target vector $r_d$) (there are illustrated the coordinates of the current position of the hand position and the coordinates of the target position, in the right-end field in FIG. 12), along with the clock time at that time, in the operation condition information database 45 in the operation database 20.

Next, when the person 4 withdraws the second robot arm 5-2 in the impedance control mode similarly, a comparison part 15 as exemplary comparison means makes a comparison between the force applied to the second robot arm 5-2 by the person 4 and the position of the hand of the second robot arm 5-2 at that time and the force and the hand position stored in the operation condition information database 45 in the chronological order. If the difference therebetween falls within a predetermined error range, the comparison part 15 considers that both of them agree with each other and outputs information indicative of the agreement to the control parameter setting part 21 along with the clock time. Based on the information indicative of the agreement from the comparison part 15, the control parameter setting part 21 changes the control mode of the second robot arm 5-2 from the impedance control mode to the position control mode and outputs, to the control part 22, a target position (withdraw position) in the position control mode, as the position of the hand of the second robot arm 5-2 stored in the operation database 20. Accordingly, based on the output from the control parameter setting part 21, the control part 22 changes over the control mode of the second robot arm 5-2 from the impedance control mode to the position control mode. After the control mode of the second robot arm 5-2 is changed to the position control mode, the second robot arm 5-2 can be automatically caused to withdraw to the withdraw position under control of the control part 22, without requiring the person 4 to operate the second robot arm 5-2.

Once the person 4 has withdrawn the second robot arm 5-2 to a position at which the arm does not interfere with the person 4 as described above, the second robot arm 5-2 can be automatically caused to withdraw in the position control mode by applying slight force thereto thereafter, when the arm is to be withdrawn next time.

Further, when it is desired to be restored to the original position from the withdraw position, the comparison part 15 makes a comparison between the actual position to which the arm has been withdrawn and the position stored in the operation condition information database 45. If they agree with the stored data in the counter chronological order, the comparison part 15 determines that it is to be restored from the withdraw position and outputs the information on the hand position and the force to the control parameter setting part 21, in the counter chronological order, as the stored condition information.

As described above, if the person 4 makes the second robot arm 5-2 withdraw in the impedance control mode to a position at which the arm facilitates the operation of the person 4, the second robot arm 5-2 can be automatically withdrawn to the position at which the arm facilitates the operation of the person 4, only by the person 4 applying slight force thereto, when the arm is to be withdrawn the next time. This can provide a control device capable of realizing robot control with excellent operation efficiency and excellent operability.

Fourth Embodiment

A control device for a robot arm according to a fourth embodiment of the present invention has a basic structure similar to that of the first embodiment, and therefore, only the parts different therefrom will be described in detail hereinafter, while the same parts will not be described.

Figure 17:
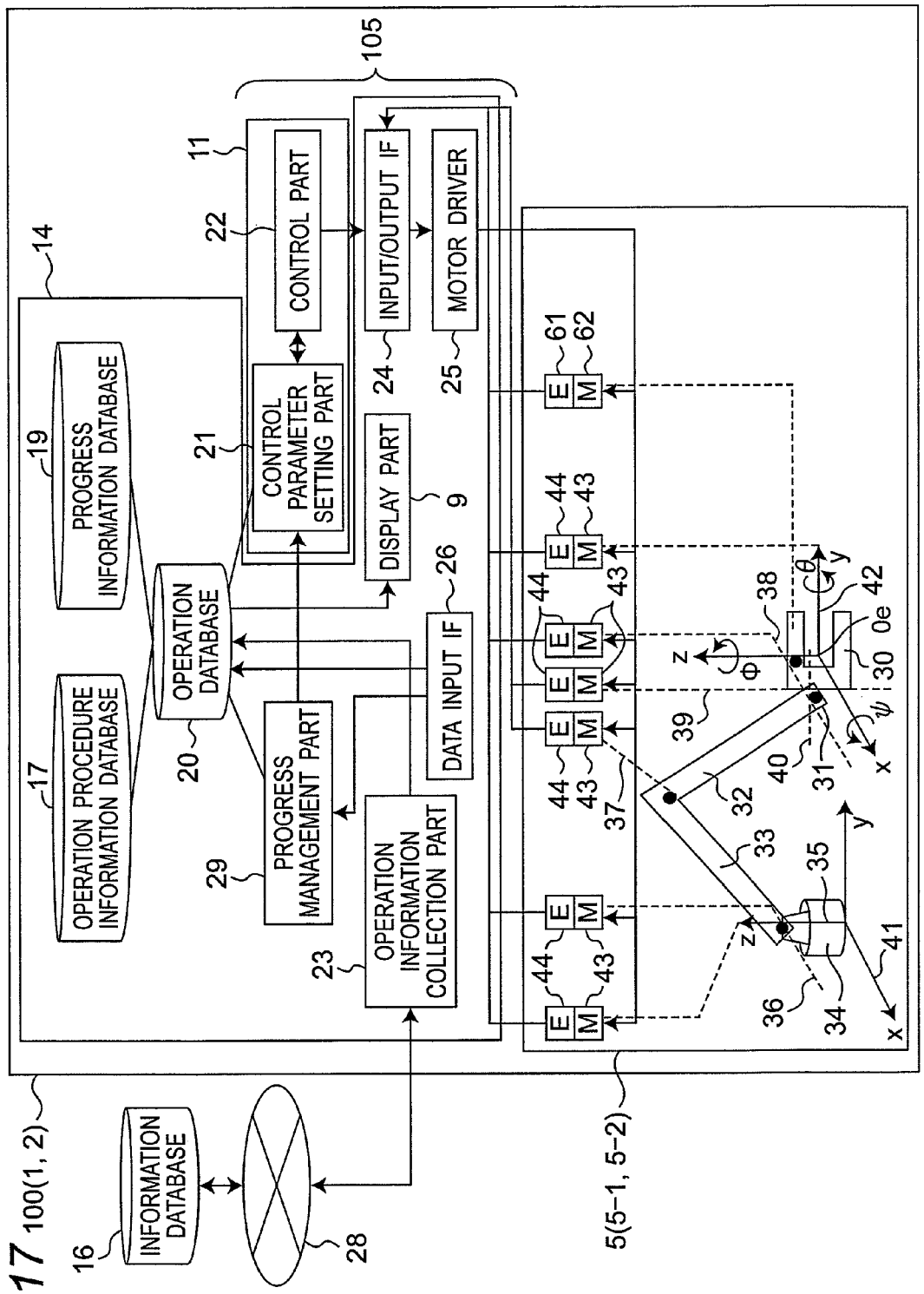
FIG. 17 is a view illustrating the detailed structures of a robot arm control device and a robot arm to be controlled, which are constituents of a robot system according to a fourth embodiment of the present invention.

FIG. 17 is a view illustrating the detailed structures of a control-device main-body part 11 and the robot arm 5 to be controlled thereby, which constitute the robot system 1 or the robot system 2 for use in a wipe cleaning operation.

The input/output IF 24, the motor driver 25, the robot arm 5, the progress management part 29, the display part 9, the control part 22, and the progress management part 23 are the same as those of the first embodiment and will not be described.

Figure 19A:
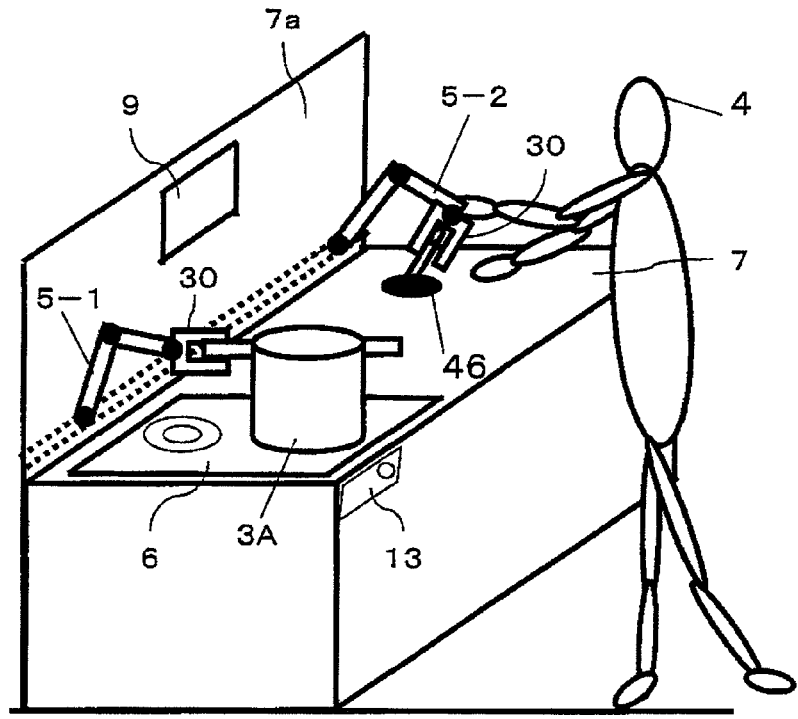
FIG. 19A is a view illustrating a state of an operation process in the robot arm control device according to the fourth embodiment.
Figure 19B:
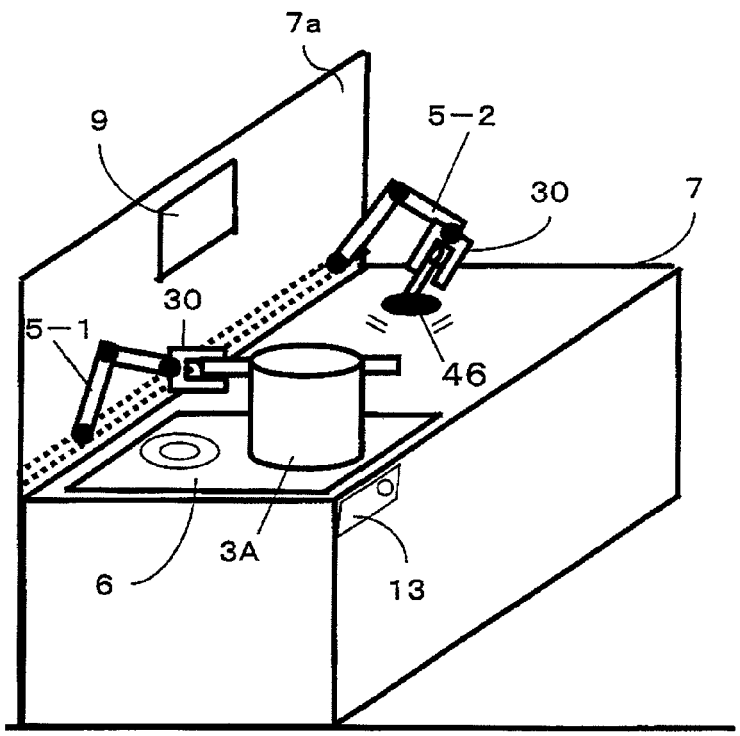
FIG. 19B is a view illustrating a state of an operation process in the robot arm control device according to the fourth embodiment.

FIG. 18 illustrates an operation database 20 for use in the wipe cleaning operation. More specifically, as in the first embodiment, it is structured to include an operation ID number as exemplary operation identification information for identifying the operation, process ID numbers as exemplary process identification information for identifying the individual processes in the operation, information on the processes corresponding to the process ID numbers, object information on the objects in the processes, operation information for use in performing the processes, expected periods which are periods expected to be required for the processes, and the amounts of ingredients to be subjected to cooking in the processes. In FIG. 18, in a process ID0001 in an operation ID0002, the description "Mount a sponge to the robot arm 5-2" is provided, and the state of FIG. 19A is realized, as an operation state, namely a state where the person 4 has mounted a sponge 46 to the hand 30 of the second robot arm 5-2 is realized. Further, in a process ID0002, the description "Push the button for starting wiping cleaning" is provided, and therefore, the state of FIG. 19B is realized, namely a state where the person 4 has pushed the wiping-cleaning start button in the operation panel 13 is realized.

The control parameter setting part 21 makes setting for changing over the control mode of the robot arm 5 between a position control mode and an impedance control mode, based on operation procedure information and information on the progress.

The position control mode is a mode in which the robot arm 5 operates based on a hand position/orientation target vector command from a target orbit creation part 55 as in the first embodiment and, more specifically, is a mode in which the arm operates during the stirring operation, wiping cleaning or other operations.

The impedance control mode is a mode in which the robot arm 5 operates based on the force applied to the robot arm 5 by the person 4 and the like and is, for example, a mode in which the arm operates in a case where the person 4 and the robot 5 perform a carrying operation in cooperation with each other as illustrated in FIG. 1B or in a case where the person 4 directly grasps the robot arm 5 and guides the robot arm 5 to a position at which the operation should be performed as illustrated in FIG. 1A.

For example, as illustrated in FIG. 18, in a case where the person 4 and the second robot arm 5-2 perform a wiping cleaning operation in cooperation with each other, when the second robot arm 5-2 performs a wiping cleaning operation by pressing the sponge 46 against the surface of the operation table 7 in the position control mode according to the instruction in the process ID0002, the person 4 may interrupt the wiping cleaning operation in order to use the place (for example, a sink) being subjected to the wiping cleaning operation by the second robot arm 5-2. In this case, a command for stopping is inputted through the data input IF 26, and the command for stopping is inputted to the control parameter setting part 21 through the progress management part 29, then the control parameter setting part 21 stops the operation of the second robot arm 5-2 through the control part 22, and also, the control parameter setting part 21 outputs, to the control part 22, a command for changing over the control mode of the second robot arm 5-2 from the position control mode to the impedance control mode, at the stop of the operation. Thus, based on this output from the control parameter setting part 21, the control part 22 changes over the control mode of the second robot arm 5-2 from the position control mode to the impedance control mode.

As a result, if the sponge 46 grasped by the second robot arm 5-2 that has been stopped according to the interruption command interferes with the person 4, it is possible to change over the control mode of the second robot arm 5-2 to the impedance control mode, which enables the person 4 to easily withdraw the second robot arm 5-2 to a withdraw position only by directly grasping and moving the second robot arm 5-2.

Since there are provided the operation database 20, the control parameter setting part 21, the progress management part 29, and the control part 22 as described above, in the case where the person 4 manipulates the robot arms 5, the person 4 can quickly move the robot arms 5 when the person 4 desires to move the robot arms 5.

Further, while, in the above-described first to fourth embodiments, there has been described a case where the operation procedure information is collected over the Internet 28, the information can be also collected from memories such as SD cards or media such as DVDs.

Further, while, in the first to fourth embodiments, there has been described a case where the control parameter setting part 21 sets the mechanical impedance parameters after interruption of stirring, the control parameter setting part 21 can set the parameters based on operations of manipulating the robot arm 5 by the person 4 through teach-by-doing and the like.

Further, in the first to fourth embodiments, the control device 105 for the robot arm 5 may adjust the gains in the position error compensation part 56 for realizing control of the mechanical impedance values of the robot arm 5 to the mechanical impedance set values, for each direction of the hand, in a pseudo manner.

Also, in the second embodiment, in the case where the person 4 has a lower skill, the expected periods may be set to larger values in the operation procedure information database 17.

Further, while in the above-described embodiments, there has been exemplified the robot arm 5, the present invention can be also applied to movable robots capable of moving on wheels, two-legged walking robots, and multi-legged walking robots, as well as arms, and can offer the same effects regarding the contact between a movable robot and a person.

By properly combining the arbitrary embodiments of the aforementioned various embodiments, the effects possessed by the embodiments can be produced.

INDUSTRIAL APPLICABILITY

The present invention is advantageous as a robot arm control device and a control method which are capable of controlling the operation of a robot arm in the case where a person and a robot such as a domestic robot perform domestic operations in cooperation with each other, a robot including a robot arm control device, and a robot arm control program. Also, the present invention can be applied to a robot arm control device and a control method, a robot including a robot arm control device, and a robot arm control program for industrial robots or movable mechanisms in production equipment and the like, as well as domestic robots.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A robot arm control device, comprising:
    an operation procedure information acquisition means for acquiring information on a procedure of a domestic operation including a plurality of processes in which a person and a robot arm cooperate with each other, the domestic operation procedure information including operation information for identifying whether each of the processes is (i) an operation process performed by only the robot arm or (ii) an operation process performed by the person and the robot arm in cooperation with each other;
    a progress management means for managing information on progress of the domestic operation performed by the person and the robot arm in cooperation with each other, based on the domestic operation procedure information which has been acquired by the operation procedure information acquisition means;
    a control parameter setting means for setting a control parameter for the robot arm, based on the domestic operation progress information from the progress management means, in such a way as to (i) control the robot arm in a position control mode in a case of the operation process performed by only the robot arm, and to (ii) control the robot arm in a control mode for causing the robot arm to move according to force of the person in a case of the operation process performed by the person and the robot arm in cooperation with each other; and
    a control means for controlling an operation of the robot arm based on the control parameter set by the control parameter setting means.

2. The robot arm control device according to claim 1, wherein
    the domestic operation procedure information is information on a procedure of a cooking operation which describes a cooking method and includes information on a procedure of the cooking method and information on ingredients to be subjected to the cooking operation in the cooking method, and
    the control parameter setting means sets a viscosity and a rigidity of mechanical impedance values for the robot arm in a case where the information on the ingredients to be subjected to the cooking operation indicates an ingredient that is prone to crush or has viscosity, to be larger than a viscosity and a rigidity of the mechanical impedance values for the robot arm in a case where the information on the ingredient to be subjected to the cooking operation indicates an ingredient that is less prone to crush or has less viscosity, based on the cooking operation progress information, when the robot arm is controlled in the control mode for causing the robot arm to move according to the force of the person.

3. The robot arm control device according to claim 1, wherein an operation of a robot arm that is different from the robot arm is controlled independently of the robot arm, by the control parameter setting means and the control means, wherein
    the domestic operation procedure information is cooking operation procedure information describing a cooking method, and also the cooking operation procedure information includes information on whether or not each of the plurality of robot arms is to be operated, and
    the control parameter setting means sets a viscosity and a rigidity of mechanical impedance values for the robot arm which is not to be operated, to be larger than a viscosity and a rigidity of mechanical impedance values for the robot arm to be operated, in a case where the robot arm is controlled in the control mode for causing the robot arm to move according to the force of the person and also one robot arm of the plurality of robot arms is a robot arm to be operated and other robot arm is a robot arm which is not to be operated.

4. The robot arm control device according to claim 1, wherein
    the domestic operation procedure information is cooking operation procedure information describing a cooking method, and progress information of the cooking operation procedure information includes information on elapsed periods of a plurality of cooking processes included in the procedure information, and
    the control parameter setting means sets magnitudes of a viscosity and a rigidity of the mechanical impedance values for the robot arm, in proportion to a magnitude of a total sum value of the elapsed periods, when the robot arm is controlled in the control mode for causing the robot arm to move according to the force of the person.

5. The robot arm control device according to claim 1, wherein the operation procedure information acquisition means acquires operation condition information which is information on a state of the domestic operation of the person who cooperates with the robot arm, in addition to the domestic operation procedure information including the operation information and the domestic operation progress information, in a case where the operation information indicates an operation process performed by the person and the robot arm in cooperation with each other, and the control parameter setting means sets the control parameter, based on the domestic operation procedure information, the domestic operation progress information, and the operation condition information.

6. The robot arm control device according to claim 5, wherein the operation condition information includes information on a position of the person, information on a dominant arm of the person, information on a state of grasping by a hand of the dominant arm of the person, or skill information indicative of an ability of the person to carry out the domestic operation, and the control parameter setting means sets the control parameter in such a way as to cause the robot arm to move in a direction toward the dominant arm of the person, further the control parameter setting means makes setting for causing the robot arm to move in a direction toward the person's arm grasping nothing, based on the state of grasping by the hand of the dominant arm of the person, and further, the control parameter setting means makes a viscosity and a rigidity of the mechanical impedances of the robot arm when the skill information indicates a lower skill, to be larger than those when the skill information indicate a higher skill.

7. The robot arm control device according to claim 5, wherein the operation condition information includes information on force which the person has applied to the robot arm when performing the domestic operation in cooperation with the robot arm and a position of the hand of the robot arm which has been moved according to the force, and further comprising a comparison means for making a comparison, in a chronological order, between the information on the force and the position of the hand of the robot arm and current information on the force of the person and the position of the hand of the robot arm, when the comparison means determines agreement thereof, the control parameter setting part changes over a control mode of the robot arm to a position control mode from a mode for causing the robot arm to move according to the force of the person.

8. A method for controlling a robot arm, comprising:

acquiring information on a procedure of a domestic operation including a plurality of processes in which a person and the robot arm cooperate with each other, by an operation procedure information acquisition means, the domestic operation procedure information including operation information for identifying whether each of the processes is (i) an operation process performed by only the robot arm or (ii) an operation process performed by the person and the robot arm in cooperation with each other, and managing information on progress of the domestic operation performed by the person and the robot arm in cooperation with each other, by a progress management means, based on the domestic operation procedure information acquired by the operation procedure information acquisition means;

setting a control parameter for the robot arm, based on the domestic operation progress information from the progress management means, by a control parameter setting means, in such a way as to (i) control the robot arm in a position control mode in a case of the operation process performed by only the robot arm and to (ii) control the robot arm in a control mode for causing the robot arm to move according to force of the person in a case of the operation process performed by the person and the robot arm in cooperation with each other; and controlling an operation of the robot arm based on the control parameter set by a control means.

9. A robot comprising:

a robot arm; and a robot arm control device, for controlling the operation of the robot arm, wherein the robot arm control device further comprises;

an operation procedure information acquisition means for acquiring information on a procedure of a domestic operation including a plurality of processes in which a person and the robot arm cooperate with each other, the domestic operation procedure information including operation information for identifying whether each of the processes is (i) an operation process performed by only the robot arm or (ii) an operation process performed by the person and the robot arm in cooperation with each other;

a progress management means for managing information on progress of the domestic operation performed by the person and the robot arm in cooperation with each other, based on the domestic operation procedure information which has been acquired by the operation procedure information acquisition means;

a control parameter setting means for setting a control parameter for the robot arm, based on the domestic operation progress information from the progress management means, in such a way as to (i) control the robot arm in a position control mode in a case of the operation process performed by only the robot arm, and to (ii) control the robot arm in a control mode for causing the robot arm to move according to force of the person in a case of the operation process performed by the person and the robot arm in cooperation with each other; and a control means for controlling an operation of the robot arm based on the control parameter set by the control parameter setting means.

10. A program for controlling a robot arm, which program is executable by a computer, comprising steps of:

acquiring information on a procedure of a domestic operation including a plurality of processes in which a person and the robot arm cooperate with each other, the domestic operation procedure information including operation information for identifying whether each of the processes is (i) an operation process performed by only the robot arm or (ii) an operation process performed by the person and the robot arm in cooperation with each other;

managing information on progress of the domestic operation performed by the person and the robot arm in cooperation with each other, based on the acquired domestic operation procedure information;

setting a control parameter for the robot arm, based on the domestic operation based on the domestic operation progress information of the progress information managing step, in such a way as to (i) control the robot arm in a position control mode in a case of an operation process performed by only the robot arm and to (ii) control the robot arm in a control mode for causing the robot arm to move according to force of the person in a case of an operation process performed by the person and the robot arm in cooperation with each other; and controlling an operation of the robot arm based on the set control parameter.

11. An integrated electronic circuit which controls a robot arm, comprising:

an operation procedure information acquisition means for acquiring information on a procedure of a domestic operation including a plurality of processes in which a person and the robot arm cooperate with each other, the domestic operation procedure information including operation information for identifying whether each of the processes is (i) an operation process performed by only the robot arm or (ii) an operation process performed by the person and the robot arm in cooperation with each other;

a progress management means for managing information on progress of the domestic operation performed by the person and the robot arm in cooperation with each other, based on the domestic operation procedure information acquired by the operation procedure information acquisition means;

a control parameter setting means for setting a control parameter for the robot arm, based on the domestic operation progress information from the progress management means, in such a way as to (i) control the robot arm in a position control mode in a case of the operation process performed by only the robot arm and to (ii) control the robot arm in a control mode for causing the robot arm to move according to force of the person in a case of the operation process performed by the person and the robot arm in cooperation with each other; and a control means for controlling an operation of the robot arm based on the control parameter set by the control parameter setting means.

12. A robot comprising:

a robot arm; and a robot arm control device, for controlling the operation of the robot arm, wherein the robot arm control device further comprises;

an operation procedure information acquisition means for acquiring information on a procedure of a domestic operation including a plurality of processes in which a person and the robot arm cooperate with each other, the domestic operation procedure information including operation information for identifying whether each of the processes is (i) an operation process performed by only the robot arm or (ii) an operation process performed by the person and the robot arm in cooperation with each other, and wherein the domestic operation procedure information is information on a procedure of a cooking operation which describes a cooking method and includes information on a procedure of the cooking method and information on ingredients to be subjected to the cooking operation in the cooking method;

a progress management means for managing information on progress of the domestic operation performed by the person and the robot arm in cooperation with each other, based on the domestic operation procedure information which has been acquired by the operation procedure information acquisition means;

a control parameter setting means for setting a control parameter for the robot arm, based on the domestic operation progress information from the progress management means, in such a way as to (i) control the robot arm in a position control mode in a case of the operation process performed by only the robot arm, and to (ii) control the robot arm in a control mode for causing the robot arm to move according to force of the person in a case of the operation process performed by the person and the robot arm in cooperation with each other, and wherein the control parameter setting means sets a viscosity and a rigidity of mechanical impedance values for the robot arm in a case where the information on the ingredients to be subjected to the cooking operation indicates an ingredient that is prone to crush or has viscosity, to be larger than a viscosity and a rigidity of the mechanical impedance values for the robot arm in a case where the information on the ingredient to be subjected to the cooking operation indicates an ingredient that is less prone to crush or has less viscosity, based on the cooking operation progress information, when the robot arm is controlled in the control mode for causing the robot arm to move according to the force of the person; and a control means for controlling an operation of the robot arm based on the control parameter set by the control parameter setting means.

* * * * *